United States Patent
Amano et al.

(10) Patent No.: US 11,252,179 B2
(45) Date of Patent: Feb. 15, 2022

(54) RISK ANALYZER AND RISK ANALYSIS METHOD

(71) Applicant: Panasonic Intellectual Property Management Co., Ltd., Osaka (JP)

(72) Inventors: Hiroshi Amano, Osaka (JP); Yusuke Nemoto, Hyogo (JP); Minehisa Nagata, Osaka (JP); Yosuke Tajika, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/466,207

(22) Filed: Sep. 3, 2021

(65) Prior Publication Data

US 2021/0400079 A1     Dec. 23, 2021

Related U.S. Application Data

(63) Continuation of application No. PCT/JP2020/011659, filed on Mar. 17, 2020.

(30) Foreign Application Priority Data

Mar. 20, 2019   (JP) .............................. JP2019-052549

(51) Int. Cl.
*H04L 29/06*     (2006.01)
*G06F 21/71*     (2013.01)

(52) U.S. Cl.
CPC .......... *H04L 63/1433* (2013.01); *G06F 21/71* (2013.01); *H04L 63/145* (2013.01)

(58) Field of Classification Search
CPC . H04L 63/14; H04L 63/1433; H04L 63/1441; H04L 63/145; G06F 21/70; G06F 21/71
See application file for complete search history.

(56) References Cited

U.S. PATENT DOCUMENTS 8,312,549 B2 * 11/2012 Goldberg ............... G06Q 40/08
                                                            726/25
8,601,587 B1 * 12/2013 Powell .................. G06F 21/552
                                                            726/25

(Continued)

FOREIGN PATENT DOCUMENTS

JP    2015-130153    7/2015
JP    2018-077597    5/2018

OTHER PUBLICATIONS

International Search Report (ISR) from International Searching Authority (Japan Patent Office) in International Pat. Appl. No. PCT/JP2020/011659, dated Jun. 16, 2020, along with an English language translation thereof.

(Continued)

*Primary Examiner* — Khang Do
(74) *Attorney, Agent, or Firm* — Greenblum & Bernstein, P.L.C.

(57) ABSTRACT

A risk analyzer analyzing risk of a system including N (natural number greater than or equal to 2) elements connected includes: an inputter receiving, as inputs, a cost of each N element for increasing a safety degree against a threat to security, a connection relationship of at least part of the N elements, an entry point being an element serving as an entry to the system, and a defense target being an element protected in the system; an identifier identifying, based on the cost of each N element and the connection relationship, a target element of one or more elements requiring a minimum total cost necessary for cutting off a target path from the entry point to the defense target by increasing a safety degree of one or more elements on the target path to a threshold value or more; and an outputter outputting element information indicating the target element.

12 Claims, 20 Drawing Sheets

(56) References Cited

U.S. PATENT DOCUMENTS

| | | | | |
|---|---|---|---|---|
| 9,992,219 | B1* | 6/2018 | Hamlet | G06Q 10/06315 |
| 10,382,473 | B1* | 8/2019 | Ashkenazy | G06F 21/577 |
| 2004/0250128 | A1* | 12/2004 | Bush | H04L 63/1433 |
| | | | | 726/23 |
| 2005/0138413 | A1* | 6/2005 | Lippmann | G06F 21/577 |
| | | | | 726/4 |
| 2005/0193430 | A1* | 9/2005 | Cohen | G06F 21/577 |
| | | | | 726/25 |
| 2006/0021049 | A1* | 1/2006 | Cook | H04L 63/1433 |
| | | | | 726/25 |
| 2006/0085858 | A1* | 4/2006 | Noel | H04L 63/1433 |
| | | | | 726/25 |
| 2007/0067845 | A1* | 3/2007 | Wiemer | H04L 63/1433 |
| | | | | 726/25 |
| 2009/0077666 | A1* | 3/2009 | Chen | G06Q 10/0631 |
| | | | | 726/25 |
| 2011/0252479 | A1* | 10/2011 | Beresnevichiene | G06F 21/577 |
| | | | | 726/25 |
| 2013/0055404 | A1* | 2/2013 | Khalili | G06Q 10/06312 |
| | | | | 726/25 |
| 2013/0347116 | A1* | 12/2013 | Flores | H04L 63/1433 |
| | | | | 726/25 |
| 2014/0007241 | A1* | 1/2014 | Gula | H04L 63/1433 |
| | | | | 726/25 |
| 2015/0381649 | A1* | 12/2015 | Schultz | H04L 63/1433 |
| | | | | 726/25 |
| 2016/0205122 | A1* | 7/2016 | Bassett | G06F 21/577 |
| | | | | 726/23 |
| 2018/0048668 | A1* | 2/2018 | Gupta | H04L 63/1433 |
| 2018/0048669 | A1* | 2/2018 | Lokamathe | G06F 30/20 |
| 2019/0190955 | A1* | 6/2019 | Khan | H04L 63/1408 |
| 2021/0006582 | A1* | 1/2021 | Yamada | H04L 63/102 |

OTHER PUBLICATIONS

Written Opinion (WO) from International Searching Authority (Japan Patent Office) in International Pat. Appl. No. PCT/JP2020/011659, dated Jun. 16, 2020, along with an English language translation thereof.

"Control System Security Risk Analysis Guide—Recommendations for risk analysis in security measures", Information-technology Promotion Agency, IT Security Center, Oct. 2017, with its English and Japanese summary (Quick Guide, Dec. 2017).

Otahara et al., "Proposal of a Method for Selecting Measures for Infrastructure Systems Considering Attack Path", SCIS 2017, The Institute of Electronics, Information and Communication Engineers, Jan. 2017, together with an English language translation thereof.

* cited by examiner

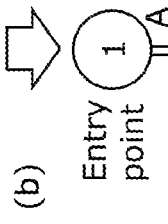
FIG. 25

RISK ANALYZER AND RISK ANALYSIS METHOD

CROSS REFERENCE TO RELATED APPLICATIONS

This is a continuation application of PCT International Application No. PCT/JP2020/011659 filed on Mar. 17, 2020, designating the United States of America, which is based on and claims priority of Japanese Patent Application No. 2019-052549 filed on Mar. 20, 2019.

FIELD

The present disclosure relates to risk analyzers and risk analysis methods.

BACKGROUND

In recent years, unauthorized attacks on control systems in industrial devices such as manufacturing facilities have stopped the manufacturing facilities. In order to prevent unauthorized programs from being installed in products at the time of manufacturing, high security is required for control systems in industrial devices. In order to cope with this requirement, for example, PTL 1 discloses a security measure planning support system which supports security measures for control systems.

CITATION LIST

Patent Literature

PTL 1: Japanese Unexamined Patent Application Publication No. 2018-77597

Non Patent Literature

NPL 1: "Security Risk Assessment Guide for Industrial Control Systems", IPA Information-technology Promotion Agency, Japan, Oct. 2, 2017

SUMMARY

However, the conventional security measure planning support system described above can be improved upon.

In view of this, the present disclosure provides a risk analyzer and a risk analysis method capable of improving upon the above related art.

In order to overcome the above disadvantage, a risk analyzer according to an aspect of the present disclosure is a risk analyzer that analyzes a risk of a system including N elements connected to each other, N being a natural number greater than or equal to 2, and the risk analyzer includes: an inputter that receives, as inputs, a cost of each of the N elements necessary for increasing a degree of safety against a threat to security, a connection relationship of at least part of the N elements, an entry point which is an element serving as an entry to the system, and a defense target which is an element to be protected in the system; an identifier that identifies, based on the cost of each of the N elements and the connection relationship, a target element requiring a minimum total cost necessary for cutting off a target path from the entry point to the defense target by increasing a degree of safety of one or more of the elements on the target path to a threshold value or more, the target element being the one or more of the elements; and an outputter that outputs element information indicating the target element.

A risk analysis method according to an aspect of the present disclosure is a risk analysis method for analyzing a risk of a system including N elements connected to each other, N being a natural number greater than or equal to 2, and the risk analysis method includes: receiving, as inputs, a cost of each of the N elements necessary for increasing a degree of safety against a threat to security, a connection relationship of at least part of the N elements, an entry point which is an element serving as an entry to the system, and a defense target which is an element to be protected in the system; identifying, based on the cost of each of the N elements and the connection relationship, a target element requiring a minimum total cost necessary for cutting off a target path from the entry point to the defense target by increasing a degree of safety of one or more of the elements on the target path to a threshold value or more, the target element being the one or more of the elements; and outputting element information indicating the target element.

These comprehensive or specific aspects may be realized by a system, a method, an integrated circuit, a computer program, or a computer-readable recording medium such as a CD-ROM or may be realized by any combination of a system, a method, an integrated circuit, a computer program, and a recording medium. The recording medium may be a non-transitory recording medium.

With the risk analyzer and the risk analysis method according to the present disclosure, it is possible to achieve further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 25 is a diagram showing the target path identified in the system shown in FIG. 23.

Figure 1:
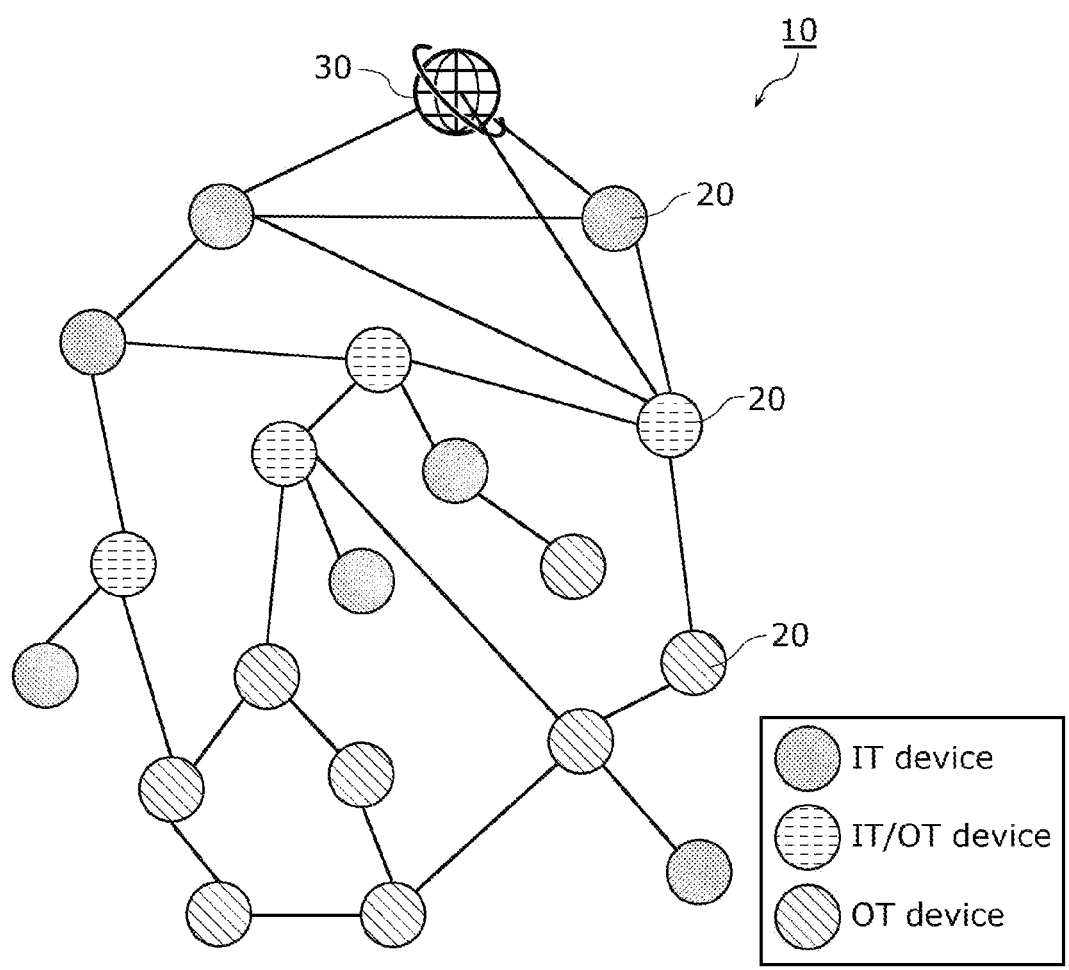
FIG. 1 is a diagram showing an example of a control system which is the target of a risk analysis performed by a risk analyzer according to Embodiment 1.

DESCRIPTION OF EMBODIMENTS (Outline of Present Disclosure)

The present inventors have found that the security measure planning support system described in the section of "Background" has the following disadvantage.

However, when the conventional security measure planning support system described above is utilized to take security measures for a control system, there are a huge number of attack paths for threat items. Since a connection relationship between the assets of the control system is generally complicated, it is difficult to cover all the attack paths. Hence, with the conventional security measure planning support system, it is impossible to support sufficient security measures.

Therefore, the present disclosure provides a risk analyzer and a risk analysis method which can support sufficient measures for increasing the security of a defense target.

In order to overcome the above disadvantage, a risk analyzer according to an aspect of the present disclosure is a risk analyzer that analyzes a risk of a system including N elements connected to each other, N being a natural number greater than or equal to 2, and the risk analyzer includes: an inputter that receives, as inputs, a cost of each of the N elements necessary for increasing a degree of safety against a threat to security, a connection relationship of at least part of the N elements, an entry point which is an element serving as an entry to the system, and a defense target which is an element to be protected in the system; an identifier that identifies, based on the cost of each of the N elements and the connection relationship, a target element requiring a minimum total cost necessary for cutting off a target path from the entry point to the defense target by increasing a degree of safety of one or more of the elements on the target path to a threshold value or more, the target element being the one or more of the elements; and an outputter that outputs element information indicating the target element.

In this way, the target element for which measures for increasing the security of the defense target need to be taken is easily identified. Hence, in the present aspect, it is possible to support feasible, sufficient measures for increasing the security of the defense target at low cost.

For example, in a risk analyzer according to an aspect of the present disclosure, the identifier may calculate a minimum cut to identify the target element.

In this way, the minimum cut is calculated, and thus it is possible to identify the target element with a small amount of computation. Hence, in the present aspect, it is possible to support feasible, sufficient security measures for increasing the security of the defense target at low cost with a small amount of computation.

For example, in a risk analyzer according to an aspect of the present disclosure, the identifier may update a cost of M elements included in the N elements to a predetermined value greater than any of costs of remaining N-M elements and use the updated cost to identify the target element, the M elements being characterized by a degree of safety that is difficult to increase, M being a natural number of 1 or more.

In this way, the element for which it is difficult or impossible to increase the degree of safety can be prevented from being identified as the target element. Hence, it is possible to reliably support feasible security measures.

For example, in a risk analyzer according to an aspect of the present disclosure, the inputter may receive a plurality of entry points as an input, the plurality of entry points each being the entry point and when the inputter receives the plurality of entry points, the identifier may identify, as the target element, one or more of the elements requiring a minimum total cost necessary for cutting off all paths including the target path and extending from a first additional element connected to only the plurality of entry points to the defense target.

In this way, for the system where a plurality of entry points are present, it is possible to identify the target element with a small amount of computation. Hence, in the present aspect, it is possible to support feasible, sufficient measures for increasing the security of the defense target at low cost with a small amount of computation.

For example, in a risk analyzer according to an aspect of the present disclosure, the inputter may receive a plurality of defense targets as an input, the plurality of defense targets each being the defense target and when the inputter receives the plurality of defense targets, the identifier may set a cost of a second additional element connected to only the plurality of defense targets to a value greater than or equal to the cost of each of the N elements and identify, as the target element, one or more of the elements requiring a minimum total cost necessary for cutting off all paths including the target path and extending from the entry point to the second additional element.

In this way, for the system where a plurality of defense targets are present, it is possible to identify the target element with a small amount of computation. Hence, in the present aspect, it is possible to support feasible, sufficient measures for increasing the security of the defense target at low cost with a small amount of computation.

For example, in a risk analyzer according to an aspect of the present disclosure, the inputter may receive a connection relationship of all the N elements as an input, and the identifier may further determine the target path based on the connection relationship of all the N elements.

In this way, even when the target path which can serve as the attack path is not clear, the connection relationship of the elements are input, and thus the target path can be identified. Hence, it is possible to support feasible, sufficient measures for increasing the security of the defense target at low cost.

For example, in a risk analyzer according to an aspect of the present disclosure, the connection relationship of the at least part of the N elements may be the target path.

In this way, when the target path which can serve as the attack path is previously found, the target path is input, and thus it is not necessary to perform processing for identifying the target path. Hence, it is possible to support feasible, sufficient measures for increasing the security of the defense target at low cost with a small amount of computation.

For example, in a risk analyzer according to an aspect of the present disclosure, the inputter may further receive, as an input, the degree of safety of each of the N elements against the threat to security, and the identifier may further identify, based on the degree of safety of each of the N elements and the connection relationship, as the target path, a path in which a total sum of the degrees of safety of elements passed while the path extends from the entry point to the defense target is lower than a threshold value among paths extending from the entry point to the defense target.

In this way, for example, the shortest path method or the like is used, and it is possible to easily identify the target path.

For example, in a risk analyzer according to an aspect of the present disclosure, the identifier may further update the degree of safety of one or more of the elements indicated by the element information to a degree of safety increased by spending the cost of a corresponding element, identify, based on the degree of safety of each of the N elements after being updated and the connection relationship, the target path among the paths extending from the entry point to the defense target, and repeat the identification of the target element, the updating of the degree of safety and the identification of the target path until the target path is not identified.

In this way, it is possible to identify the target element on which the cost needs to be spent according to how the degree of safety is increased when the cost is spent (that is, cost efficiency). Hence, it is possible to support highly effective security measures at low cost.

For example, in a risk analyzer according to an aspect of the present disclosure, the system may be a control system, and the N elements may be N assets of the control system.

In this way, it is possible to perform a risk analysis on a control system in which a large number of assets are provided and in which the connection relationship is complicated. A control system installed in a factory may include, for example, a device in which an operation system (OS) is not supported or a device on which processing for increasing the degree of safety cannot be performed in the first place. In other words, it is not always possible to constantly take security measures for all assets included in the control system. In terms of availability required for a control system, there is an asset for which security measures such as the restriction of transmission and reception of control commands should not be taken.

Even in such a case, in the present aspect, among the paths extending from the entry point to the defense target, in the target path for which measures against a threat to security need to be taken, the target element for which measures for increasing the degree of safety need to be taken is identified. Hence, it is possible to support sufficient measures for increasing the security of the defense target for the control system.

For example, in a risk analyzer according to an aspect of the present disclosure, the system may be a control system, and the N elements may be a plurality of attack steps included in attack procedures for a plurality of assets of the control system.

In this way, it is possible to perform a risk analysis which includes not only the connection relationship between the assets but also the attack procedures within the assets. Hence, a more specific target element is provided, and thus it is possible to effectively support sufficient measures for increasing the security of the defense target.

For example, in a risk analyzer according to an aspect of the present disclosure, the system may be an attack procedure for an asset of a control system, and the N elements may be N attack steps included in the attack procedure.

In this way, it is possible to perform a risk analysis based on the attack procedures within the assets, and thus it is possible to support sufficient measures for increasing the security of the defense target for the assets.

For example, a risk analysis method according to an aspect of the present disclosure is a risk analysis method for analyzing a risk of a system including N elements connected to each other, N being a natural number greater than or equal to 2, and the risk analysis method includes: receiving, as inputs, a cost of each of the N elements necessary for increasing a degree of safety against a threat to security, a connection relationship of at least part of the N elements, an entry point which is an element serving as an entry to the system, and a defense target which is an element to be protected in the system; identifying, based on the cost of each of the N elements and the connection relationship, a target element requiring a minimum total cost necessary for cutting off a target path from the entry point to the defense target by increasing a degree of safety of one or more of the elements on the target path to a threshold value or more, the target element being the one or more of the elements; and outputting element information indicating the target element.

In this way, the target element for which measures for increasing the security of the defense target need to be taken is easily identified. Hence, in the present aspect, it is possible to support feasible, sufficient measures for increasing the security of the defense target at low cost.

For example, a recording medium according to an aspect of the present disclosure is a non-transitory computer-readable recording medium in which a program for causing a computer to execute the risk analysis method described above is recorded.

Embodiments will be specifically described below with reference to drawings.

The embodiments described below show comprehensive or specific examples. Values, shapes, materials, constituent elements, the arrangement and connection form of the constituent elements, steps, the order of the steps, and the like which are shown in the embodiments below are examples and are not intended to limit the present disclosure. Among the constituent elements in the embodiments below, constituent elements which are not recited in independent claims will be described as arbitrary constituent elements.

The drawings are schematic views and are not exactly shown. Hence, for example, scales and the like in the drawings are not necessarily the same. In the drawings, substantially the same configurations are identified with the same reference signs, and repeated description thereof will be omitted or simplified.

Embodiment 1

[Outline of System Serving as Target of Risk Analysis]

An outline of a control system which is an example of a system serving as the target of a risk analysis performed by a risk analyzer according to Embodiment 1 will first be described with reference to FIG. 1. FIG. 1 is a diagram showing an example of control system 10 according to the present embodiment.

As shown in FIG. 1, control system 10 includes N elements 20 which are connected to each other. Here, N is a natural number greater than or equal to 2. In FIG. 1, N elements 20 are represented by shaded circles. Each of N elements 20 is connected to at least one of other elements 20.

In the present embodiment, elements 20 are the assets of control system 10. The assets are, for example, devices such as a communication device, a control device, a manufacturing facility, an information processing device, a sensor, a drive device, and a storage device. The assets are connected to be able to communicate with each other. The asset can communicate unidirectionally or bidirectionally with the other asset which is connected, and transmits or receives information or signals.

Control system 10 is, for example, a system which controls an industrial device. Control system 10 is, for example, a system which is installed in a factory for manufacturing products such as electronic devices. As shown in FIG. 1, control system 10 is connected to Internet 30. N elements 20 include, as examples of the asset, information technology (IT) devices, operational technology (OT) devices, and IT/OT devices.

The IT device has, for example, a communication function capable of connecting to Internet 30. An IT device which is not connected to Internet 30 may be included in the IT devices of control system 10. The OT device is a device which performs control based on physical conditions. For example, the OT device detects a temperature, a pressure, or the like to control a valve, a motor, or the like based on the result of the detection. The IT/OT device is a device which has both the functions of the IT device and the OT device.

As shown in FIG. 1, in control system 10 installed in a general factory, the connection of the IT devices, the OT devices and the IT/OT devices is not organized, and the devices are connected in a complicated manner. The connection relationship thereof is also changed such as by removal of an existing device and addition of a new device. Since in general control system 10, importance is placed on availability, it is often difficult to organize the connection relationship of the devices. Hence, it is difficult to identify a device for which security measures need to be taken.

As the number of devices is increased and the connection relationship is more complicated, the number of paths from a device serving as an entry point to a device serving as an attack target is significantly increased. Hence, it is difficult to determine whether or not measures need to be taken for all devices and paths.

A risk analyzer and a risk analysis method will be described below which can support sufficient measures for control system 10 as shown in FIG. 1 to increase the security of a defense target with a small amount of computation.

[Risk Analyzer]

Figure 2:
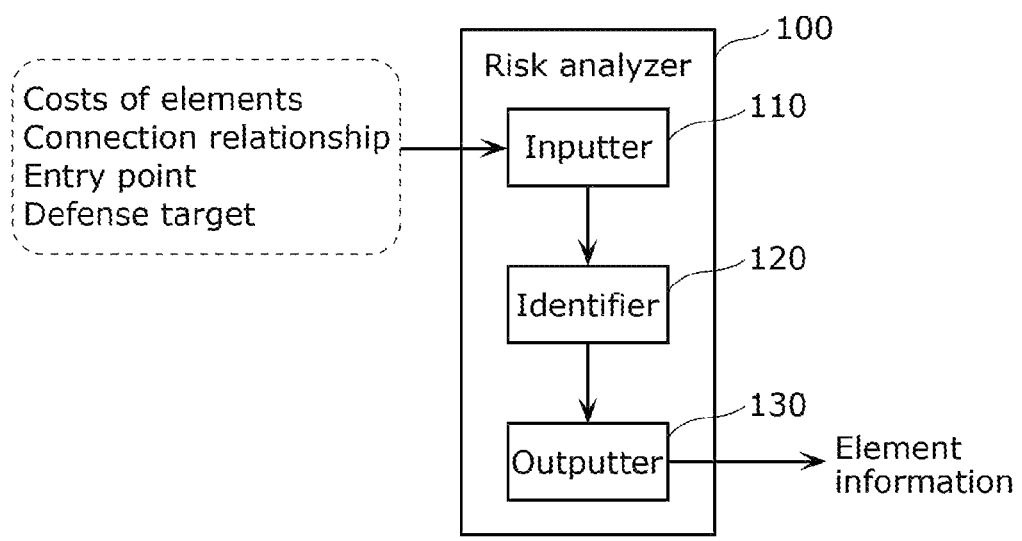
FIG. 2 is a block diagram showing the configuration of the risk analyzer according to Embodiment 1.

FIG. 2 is a block diagram showing the configuration of risk analyzer 100 according to the present embodiment. Risk analyzer 100 analyzes the risk of a system (for example, control system 10 shown in FIG. 1) including N elements connected to each other. In the present embodiment, risk analyzer 100 identifies, in the system having N assets, assets for which measures for blocking an attack passing through an attack path for a predetermined asset need to be taken. Risk analyzer 100 is, for example, a computer device.

As shown in FIG. 2, risk analyzer 100 includes inputter 110, identifier 120 and outputter 130.

Inputter 110 receives, as inputs, information used for identifying elements for which security measures need to be taken. Specifically, as shown in FIG. 2 inputter 110 receives, as inputs, a cost of each of the N elements necessary for increasing the degree of safety against a threat to security, the connection relationship of at least part of the N elements, an entry point which is an asset serving as an entry to the system, and a defense target which is an asset to be protected in the system. In the present embodiment, N is the total number of elements of the system. The N elements are the N assets of the control system.

The degree of safety is a value which is determined for each asset based on an asset-based risk analysis. For example, the degree of safety is determined based on a DREAD model. The degree of safety means that as its value is increased, safety against a threat to security is increased. The asset-based risk analysis is performed, for example, by a method disclosed in NPL 1.

The cost is a measure cost necessary for increasing the degree of safety to a first threshold value or more, and is a predetermined value. The first threshold value is a criterion which needs to be satisfied for achieving a state where the safety of an asset is sufficiently high, and is a value less than or equal to a second threshold value which is a threshold value for the degree of safety necessary for cutting off a path. In the present embodiment, the first threshold value is equal to the second threshold value. Hence, when a cost is spent on an asset, the safety of the asset is sufficiently increased to be greater than or equal to the first threshold value (second threshold value), and thus an attack path passing through the asset is cut off. An element on which a cost needs to be spent is a target element.

The connection relationship of at least part is, for example, the connection relationships of all the N elements. For example, the connection relationship is information indicating all pairs of two assets which are connected to be able to communicate with each other. The connection relationship may further include the direction of connection. For example, in a case where asset A and asset B are connected together, when asset A can transmit information to asset B but asset B cannot transmit information to asset A, a connection relationship between asset A and asset B may include the direction of connection from asset A to asset B.

The entry point is an asset through which an entry from the outside is allowed. The entry point is, for example, an asset which is connected to Internet 30. The entry point may also be an asset which has an interface capable of connecting a memory device such as a universal serial bus (USB) memory or another device.

The defense target is an asset which is determined based on a business damage-based risk analysis. Specifically, the defense target is an asset in which when the asset receives an attack, a business damage is increased beyond a given reference. The business damage-based risk analysis is performed, for example, by a method disclosed in NPL 1.

As described above, each of the degree of safety, the cost, the connection relationship, the entry point, and the defense target is objectively determined based on a predetermined method. Hence, since no artificial evaluation is involved, variations in evaluation based on the skills of evaluators are not produced. Therefore, it is possible to stably support sufficient measures for increasing the security of the defense target.

Inputter 110 may receive, as an input, a plurality of entry points or a plurality of defense targets. Processing when inputter 110 receives, as inputs, a plurality of entry points or a plurality of defense targets will be described later in Embodiment 3.

Inputter 110 may receive, as an input, initial values of the degrees of safety of a plurality of elements. The initial value of the degree of safety is the degree of safety before measures against a threat to security are taken for the corresponding element. The degree of safety when a cost is spent, that is, the degree of safety after measures are taken is indicated by the sum of the initial value of the degree of safety and an amount by which the cost is spent to enhance the degree of safety.

Inputter 110 stores, in a storage (not shown), input information acquired by receiving information as inputs. The storage may be included in risk analyzer 100 or may be an external storage device which can communicate with risk analyzer 100.

Inputter 110 is at least one of input devices such as a keyboard, a mouse, and a touch panel. Inputter 110 may also be a communication interface which is connected to a storage device or the like.

Identifier 120 identifies, based on the cost of each of the N elements and the connection relationship, a target element requiring a minimum total cost necessary for cutting off a target path from an entry point to a defense target by increasing the degree of safety of one or more elements on the target path to the second threshold value or more, the target element being the one or more of the elements. The target element is an element on which a cost needs to be spent on the target path.

In the present embodiment, identifier 120 calculates a minimum cut to identify the target element. Specifically, identifier 120 uses Dinic algorithm, Ford-Fulkerson algorithm, or Edmonds-Karp algorithm to calculate the minimum cut. These methods are only examples, and a means for calculating the minimum cut with identifier 120 is not limited to these methods. For example, in a directed graph where assets are assumed to be vertices (nodes) and a cost is given as the weight of a directed edge connecting assets, identifier 120 identifies such a directed edge (minimum cut) that a cost for blocking the target path with the entry point set to a starting point and the defense target set to an end point is decreased, and identifies, as the target element, the asset to which the identified directed edge is connected.

Identifier 120 is realized by a nonvolatile memory in which programs are stored, a volatile memory which is a temporary storage region for executing a program, an input/output port, a processor which executes a program, and the like. The functions of identifier 120 may be realized by software executed in the processor or may be realized by hardware such as an electrical circuit including one or more electronic components.

Outputter 130 outputs element information indicating the target element identified by identifier 120. Outputter 130 is at least one output device such as a display or a printer. Outputter 130 may also be a communication interface for an external device which can communicate with risk analyzer 100.

[Operation (Risk Analysis Method)]

Figure 3:
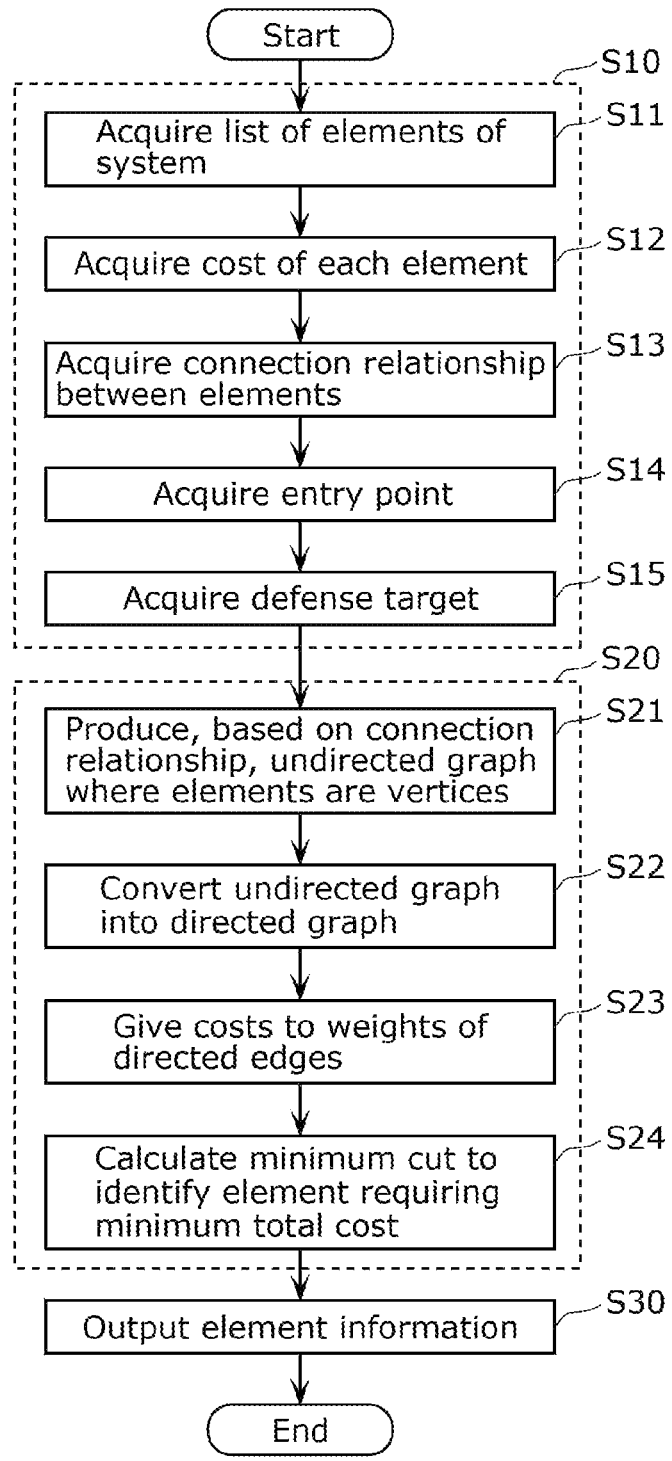
FIG. 3 is a flowchart showing the operation of the risk analyzer according to Embodiment 1.

Then, the operation of risk analyzer 100 according to the present embodiment, that is, the risk analysis method will be described with reference to FIG. 3. FIG. 3 is a flowchart showing the operation of risk analyzer 10 according to the present embodiment.

As shown in FIG. 3, inputter 110 first acquires the input information necessary for identifying the target element (S10). Specifically, inputter 110 acquires a list of the elements of the system (S11). The list of the elements is a list of information for identifying all assets included in the system. Then, inputter 110 acquires the cost of each element (S12), and then acquires the connection relationship between the elements (S13). Furthermore, inputter 110 acquires the entry point (S14) and then acquires the defense target (S15).

The order in which inputter 110 acquires the pieces of information is not particularly limited. For example, inputter 110 may acquire a correspondence table to which, for each element, the cost, an element connected, a flag indicating whether or not the element is the entry point, and a flag indicating whether or not the element is the defense target are made to correspond. Inputter 110 acquires the correspondence table to be able to simultaneously acquire the list of the elements, the costs, the connection relationship, the entry point, and the defense target.

Then, identifier 120 calculates the minimum cut based on the input information acquired by inputter 110 to identify the target element (S20). For example, identifier 120 identifies the target element based on the connection relationship of all the input elements with all the paths extending from the entry point to the defense target set to the target element.

Figure 4:
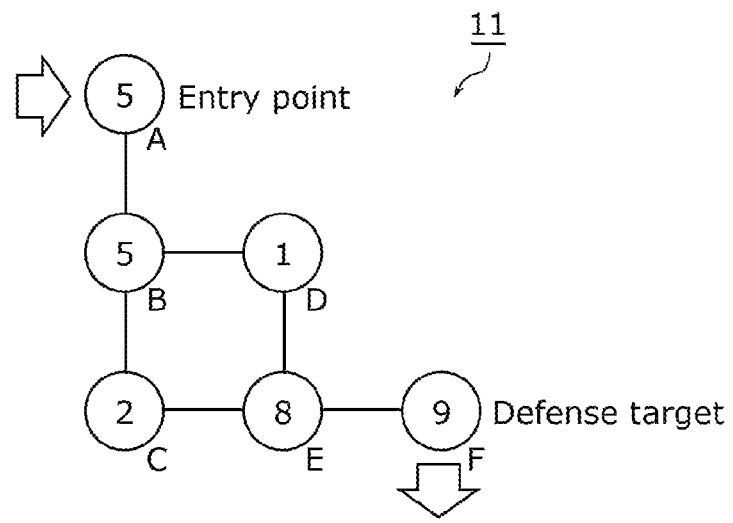
FIG. 4 is a diagram which is produced based on input information in the risk analyzer according to Embodiment 1 and which is used for illustrating an undirected graph of a system serving as the target of a risk analysis.

Specifically, identifier 120 first produces an undirected graph in which the N elements are assumed to be vertices (nodes) (S21). Edges between the vertices in the undirected graph are determined based on the connection relationships of the N elements. For example, identifier 120 produces an undirected graph as shown in FIG. 4. In an example shown in FIG. 4, control system 11 is a control system formed with six assets A to F connected to each other. Asset A is the entry point. Asset F is the defense target.

Here, FIG. 4 is a diagram which is produced based on the information input to risk analyzer 100 according to the present embodiment and which is used for illustrating the undirected graph of control system 11 serving as the target of a risk analysis. In FIG. 4, the assets (vertices) of control system 11 are represented by white circles. Values displayed in the white circles indicate costs necessary for increasing the degree of safety of the assets. The costs are the weights of the vertices in the undirected graph. A line segment (edge) connecting two assets (circles) indicates that the two assets are connected to be able to communicate with each other. An open arrow directed toward an asset indicates that the asset is the entry point. An open arrow extending from an asset indicates that the asset is the defense target. This is the same as in FIGS. 6, 7, 9, 11, 14 to 17, 19, 20, 22, 23, and 25, which will be described later.

Figure 5:
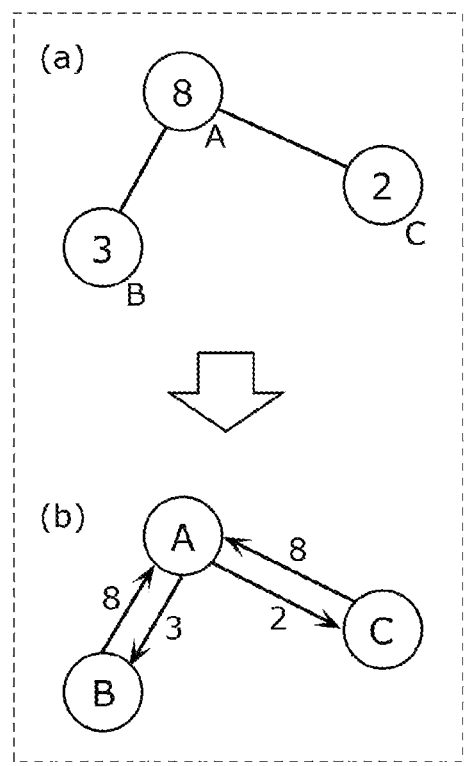
FIG. 5 is a diagram for illustrating processing for converting the undirected graph into a directed graph in the risk analyzer according to Embodiment 1.

Then, as shown in FIG. 3, identifier 120 converts the undirected graph produced into a directed graph (S22), and costs are given to the weights of directed edges (S23). Here, FIG. 5 is a diagram for illustrating processing for converting the undirected graph into the directed graph in risk analyzer 100 according to the present embodiment. For example, identifier 120 converts the undirected graph with weights given to the vertices shown in (a) of FIG. 5 into the directed graph with weights given to edges shown in (b) of FIG. 5.

Specifically, identifier 120 first converts edges connecting two assets into directed edges extending in both directions. Then, identifier 120 gives the weights (that is, the costs) of the assets to which arrows are connected to the weights of the directed edges input to the assets, that is, the weights of the directed edges represented by the arrows whose tips are connected to the assets.

Figure 6:
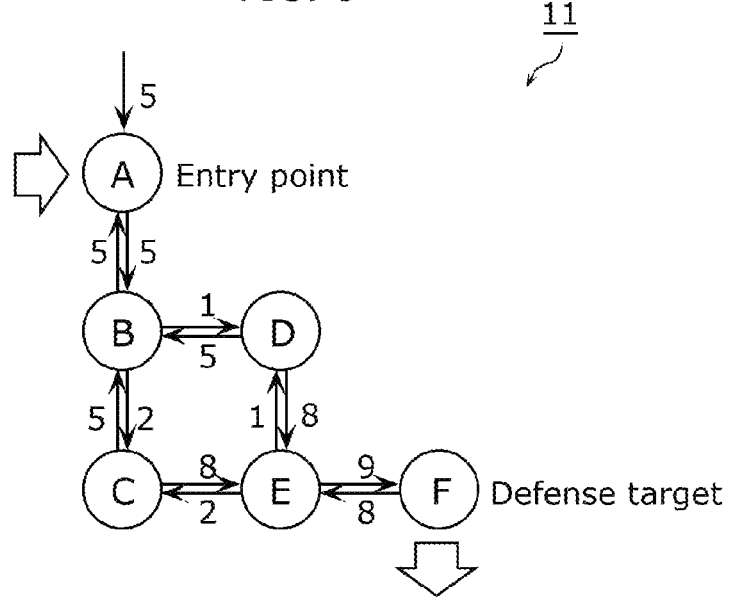
FIG. 6 is a diagram showing the directed graph obtained by the conversion of the undirected graph shown in FIG. 4.

The undirected graph of control system 11 shown in FIG. 4 is converted into the directed graph as shown in FIG. 6. FIG. 6 is a diagram showing the directed graph obtained by the conversion of the undirected graph shown in FIG. 4.

Then, as shown in FIG. 3, identifier 120 calculates the minimum cut to identify target elements requiring a minimum total cost necessary for cutting off all target paths (S24). For example, based on the directed graph shown in FIG. 6, identifier 120 identifies, as the target paths extending from the entry point to the defense target, a first path passing through asset A, asset B, asset C, asset E, and asset F in this order and a second path passing through asset A, asset B, asset D, asset E, and asset F in this order. The target path is identified under conditions in which the target path is allowed to pass through one asset only once on the path.

Figure 7:
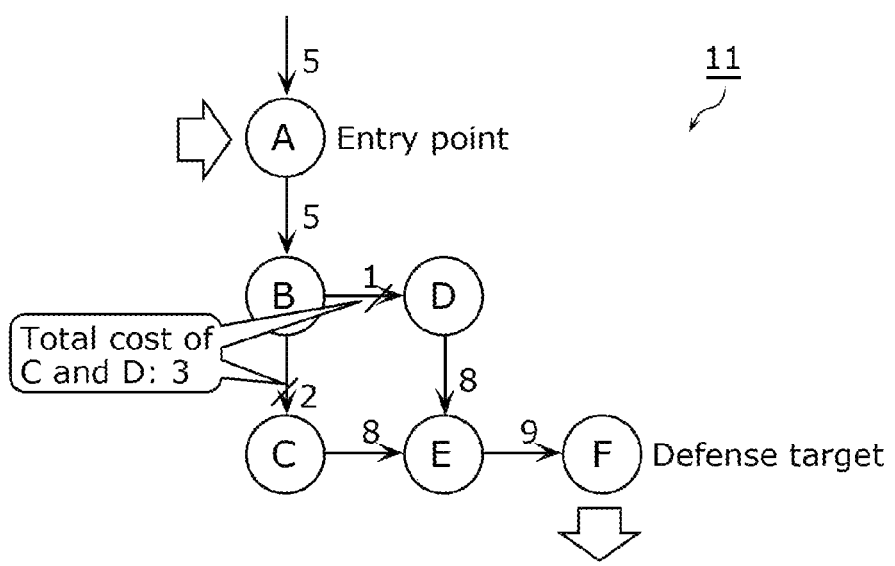
FIG. 7 is a diagram for illustrating a minimum cut calculated based on the directed graph shown in FIG. 6.

FIG. 7 is a diagram for illustrating the minimum cut calculated based on the directed graph shown in FIG. 6. For ease of understanding, in FIG. 7, only the directed edges belonging to the two paths described above are shown. In FIG. 7, line segments obliquely crossing the directed edges indicate the positions of the minimum cut. This is the same as in FIGS. 15, 17 and 20.

Identifier 120 calculates the minimum cut necessary for cutting off the target paths extending from asset A serving as the entry point to asset F serving as the defense target to identify the two cut points for the directed edge extending from asset B to asset C and the directed edge extending from asset B to asset D, and thereby can find that the total cost thereof is 3 which is the minimum value. In other words, identifier 120 identifies asset C and asset D as target assets on which costs need to be spent in order to increase the degree of safety.

As shown in FIG. 3, outputter 130 finally outputs the element information indicating the target element identified by identifier 120 (S30). The form in which outputter 130 outputs the element information is not particularly limited. For example, as shown in FIG. 7, outputter 130 may display a graph indicating cut positions. Outputter 130 may also indicate information for identifying the target elements in text. Examples of the information for identifying the target elements include asset names, installation positions, and the like. Outputter 130 may output costs which need to be spent on assets.

When a plurality of combinations of elements for requiring the minimum total cost are identified, outputter 130 outputs element information indicating all the combinations. Outputter 130 may also output element information indicating only one of the combinations.

As described above, in the target path from the entry point to the defense target, risk analyzer 100 according to the present embodiment can identify, as the target elements, elements on which costs need to be spent in order to take security measures and in which the costs are lowered. In this way, in the present embodiment, it is possible to support feasible, sufficient security measures at low cost.

Embodiment 2

Embodiment 2 will then be described.

In Embodiment 1, the example is described where the inputter receives, as an input, the connection relationships of the elements of the system. By contrast, in Embodiment 2, the inputter receives, as an input, the target path from the entry point to the defense target. Differences from Embodiment 1 will be mainly described below, and the description of the same parts will be omitted or simplified.

The configuration of a risk analyzer according to the present embodiment is the same as that of risk analyzer 100 according to Embodiment 1. The following description is based on risk analyzer 100 shown in FIG. 2.

Figure 8:
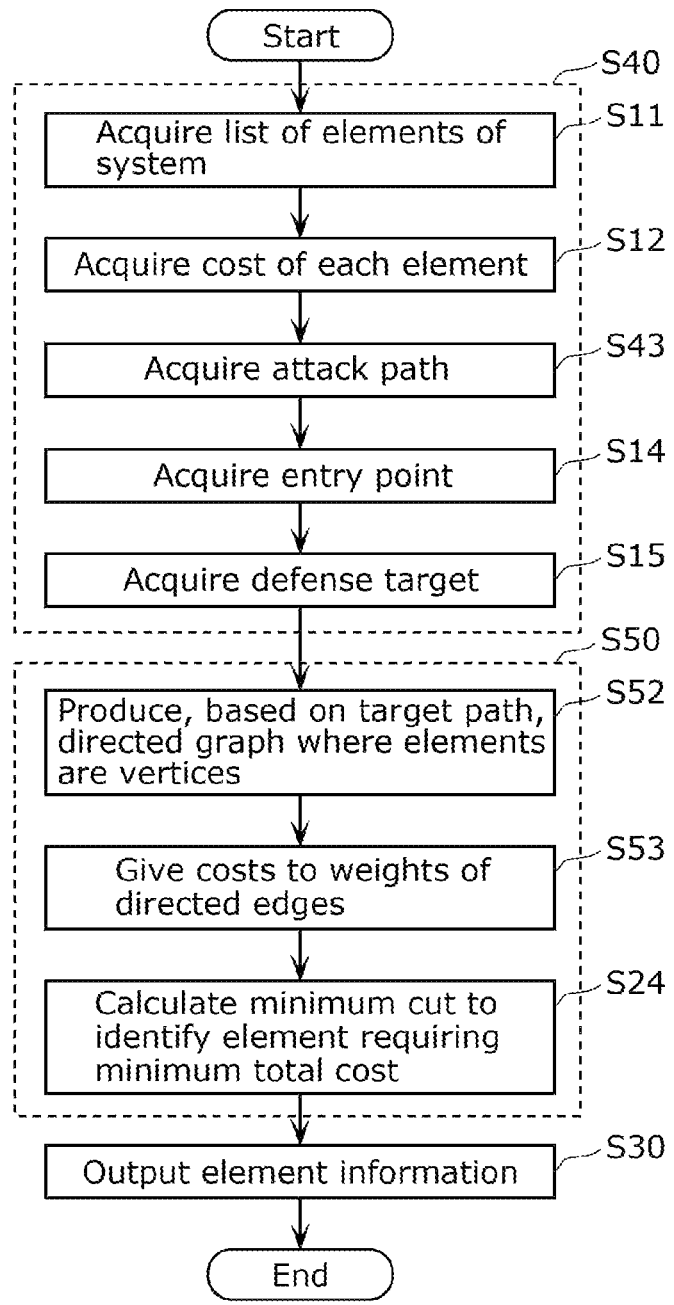
FIG. 8 is a flowchart showing the operation of a risk analyzer according to Embodiment 2.

FIG. 8 is a flowchart showing the operation of risk analyzer 100 according to the present embodiment.

As shown in FIG. 8, inputter 110 first acquires the input information necessary for identifying the target element (S40). Specifically, inputter 110 acquires a list of the elements of the system (S11). Then, inputter 110 acquires the cost of each element (S12), and then acquires an attack path (S43). Furthermore, inputter 110 acquires the entry point (S14) and then acquires the defense target (S15). As in Embodiment 1, the order in which inputter 110 acquires the pieces of information is not particularly limited.

Then, identifier 120 calculates the minimum cut based on the input information acquired by inputter 110 to identify the target element (S50). Specifically, identifier 120 first produces, based on the attack path, a directed graph in which the N elements are assumed to be vertices (S52). Directed edges connecting the vertices are determined based on the attack path.

Figure 9:
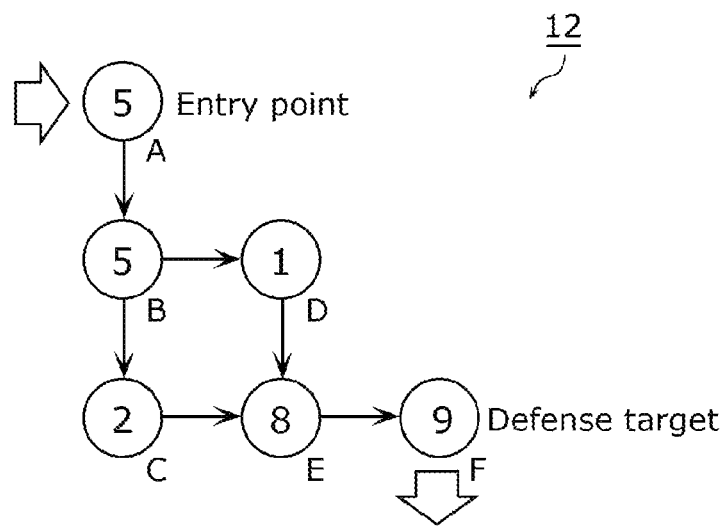
FIG. 9 is a diagram which is produced based on input information in the risk analyzer according to Embodiment 2 and which is used for illustrating a directed graph of a system serving as the target of a risk analysis.

For example, identifier 120 produces a directed graph as shown in FIG. 9. Since in the input information, a cost is made to correspond to each element, identifier 120 produces the directed graph with weights (costs) given to the vertices.

Here, FIG. 9 is a diagram which is produced based on the input information in risk analyzer 100 according to the present embodiment and which is used for illustrating the directed graph of a system serving as the target of a risk analysis. In an example shown in FIG. 9, control system 12 is a control system formed with six assets A to F connected to each other. Asset A is the entry point. Asset F is the defense target. The attack paths are a first path passing through asset A, asset B, asset C, asset E, and asset F in this order and a second path passing through asset A, asset B, asset D, asset E, and asset F in this order.

Figure 10:
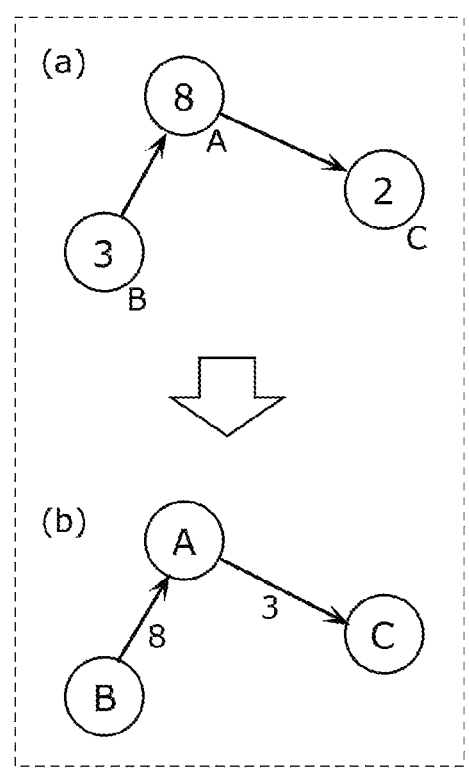
FIG. 10 is a diagram for illustrating processing for converting the weights of vertices in the directed graph into the weights of directed edges, in the risk analyzer according to Embodiment 2.

Then, as shown in FIG. 8, identifier 120 gives costs to the weights of directed edges (S53). Here, FIG. 10 is a diagram for illustrating processing for converting the weights of vertices in a directed graph into the weights of directed edges in risk analyzer 100 according to the present embodiment. For example, identifier 120 converts the directed graph with weights given to the vertices (nodes) shown in (a) of FIG. 10 into the directed graph with weights given to the edges shown in (b) of FIG. 10. Specifically, identifier 120 gives the weights (that is, the costs) of the assets to which arrows are connected to the weights of the directed edges input to the assets, that is, the weights of the directed edges represented by the arrows whose tips are connected to the assets.

Figure 11:
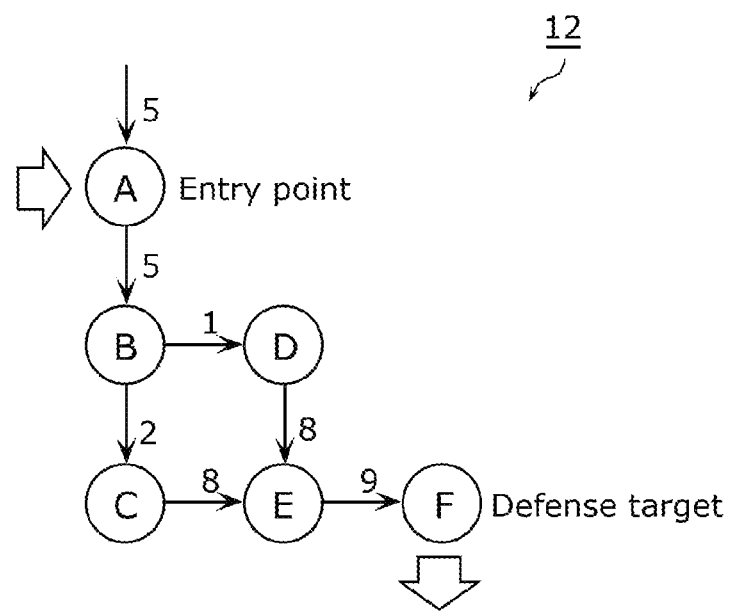
FIG. 11 is a diagram showing a directed graph obtained by converting the weights of the vertices into the weights of the edges based on the directed graph shown in FIG. 9.

In this way, the directed graph of control system 12 shown in FIG. 9 is converted into a directed graph as shown in FIG. 11. FIG. 11 is a diagram showing the directed graph obtained by converting the weights of the vertices into the weights of the edges based on the directed graph shown in FIG. 9.

The subsequent processing is the same as in Embodiment 1. Identifier 120 identifies the target elements (S24), and outputter 130 outputs element information indicating the identified target elements (S30). In the directed graph shown in FIG. 11, asset C and asset D are identified as the target elements.

As described above, risk analyzer 100 according to the present embodiment receives, as an input, the attack path serving as an example of the connection relationship of at least part of the N elements, and thereby can easily produce the directed graph indicating the target path from the entry point to the defense target. Hence, it is possible to reduce the amount of computation necessary for identifying the target element, and thus it is possible to support feasible, sufficient security measures at low cost with a small amount of computation.

[Variation]

Here, a variation of Embodiment 2 will be described. Specifically, another example of the processing for converting the weights of the vertices into the weights of the directed edges in the directed graph will be described with reference to FIG. 12.

In FIG. 10, for simplification of description, the case where the minimum cut can be accurately calculated by a method different from a method described in Variation 2 is described. However, in the method shown in FIG. 10, when directed edges from a plurality of assets are connected (input) to one asset, it is likely that assets for which measures need to be taken cannot be accurately derived. In the present variation, an example of the processing will be described where even when directed edges from a plurality of assets are connected to one asset, assets for which measures need to be taken can be accurately derived.

Figure 12:
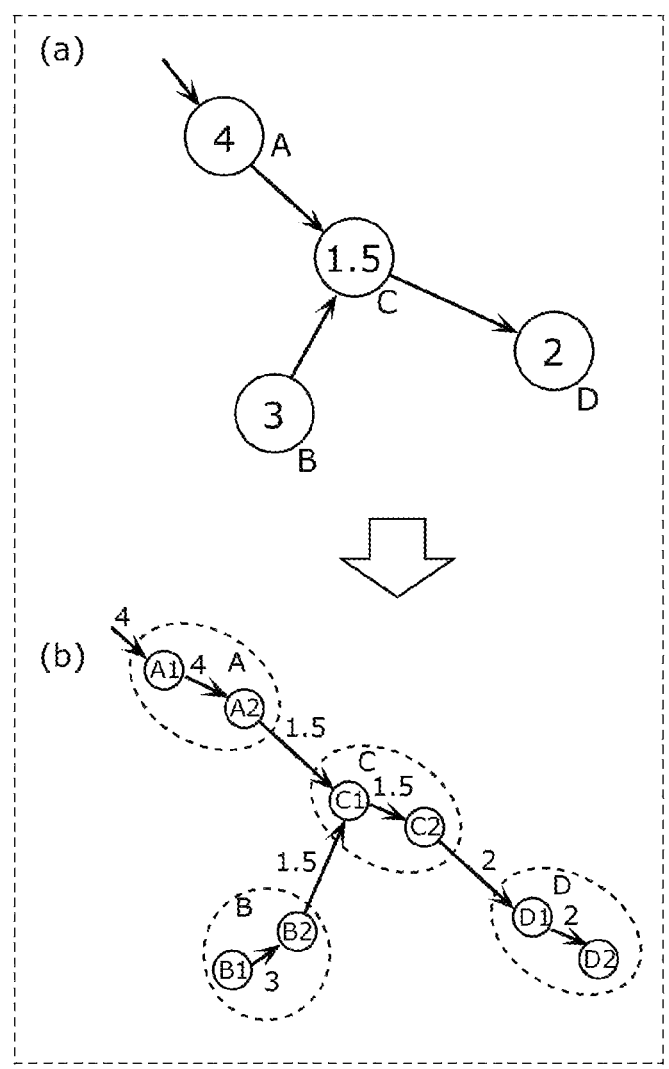
FIG. 12 is a diagram for illustrating processing for converting the weights of vertices into the weights of directed edges in a directed graph in a risk analyzer according to a variation of Embodiment 2.

FIG. 12 is a diagram for illustrating processing for converting the weights of vertices into the weights of directed edges in a directed graph in risk analyzer 100 according to the present variation. In the present variation, identifier 120 changes the directed graph with weights given to the vertices shown in (a) of FIG. 12 into the directed graph with weights given to the edges shown in (b) of FIG. 12.

(a) of FIG. 12 shows a system which has four assets A to D. Directed edges from asset A and asset B are connected to asset C. The method for converting the directed graph according to the present variation is particularly useful when a plurality of assets are connected to one asset.

Specifically, identifier 120 divides each of a plurality of elements of the system into two vertices. For example, as shown in (b) of FIG. 12, asset A is divided into asset A1 and asset A2. In the same manner for asset B, asset C, and asset D, asset B is divided into asset B1 and asset B2, asset C is divided into asset C1 and asset C2, and asset D is divided into asset D1 and asset D2.

Identifier 120 connects, to asset C1, all directed edges extending from other assets to asset C. In other words, asset C1 is a vertex to which the directed edges extending from the other assets to asset C are connected. For example, as shown in (b) of FIG. 12, directed edges extending from asset A (asset A2) and asset B (asset B2) are connected to asset C1.

Identifier 120 sets, to edges extending from asset C2, all directed edges extending from asset C to other directed edges. In other words, asset C2 is a vertex to which the directed edges extending from asset C to the other directed edges are connected. For example, as shown in (b) of FIG. 12, a directed edge extending to asset D (asset D1) is connected to asset C2.

Furthermore, identifier 120 connects asset C1 and asset C2 together with a directed edge extending from asset C1 to asset C2. The same is true for asset A1, asset A2, asset B1, asset B2, asset D1, and asset D2.

Furthermore, identifier 120 gives the weights of the vertices to the directed edges. For example, identifier 120 gives a cost serving as the weight of the vertex of asset C to directed edges connected to asset C1. In an example shown in (b) of FIG. 12, 1.5 serving as the cost of asset C to which asset A2 and asset B2 are connected is given to the directed edges connected from asset A2 and asset B2 to asset C1.

Identifier 120 gives a cost serving as the weight of the asset to which asset C2 is connected to the directed edge extending from asset C2. In the example shown in (b) of FIG. 12, 2 serving as the cost of asset D to which asset C2 is connected is given to the directed edge connected from asset C2 to asset D1.

Identifier 120 gives 1.5 serving as the cost of asset C to the directed edge connected from asset C1 to asset C2. The same is true for asset A, asset B, and asset D.

In this way, even when directed edges from a plurality of assets are connected to one asset, the minimum cut can be accurately derived. In the example shown in FIG. 10, the numbers of vertices and directed edges are smaller than in the present variation, and thus the amount of computation is advantageously reduced.

Embodiment 3

Embodiment 3 will then be described.

In Embodiments 1 and 2, the case is described where one entry point and one defense target alone are provided. By contrast, in Embodiment 3, the inputter receives, as inputs, a plurality of entry points and a plurality of defense targets. Differences from Embodiments 1 and 2 will be mainly described below, and the description of the same parts will be omitted or simplified.

The configuration of a risk analyzer according to the present embodiment is the same as that of risk analyzer 100 according to Embodiment 1. The following description is based on risk analyzer 100 shown in FIG. 2.

Figure 13:
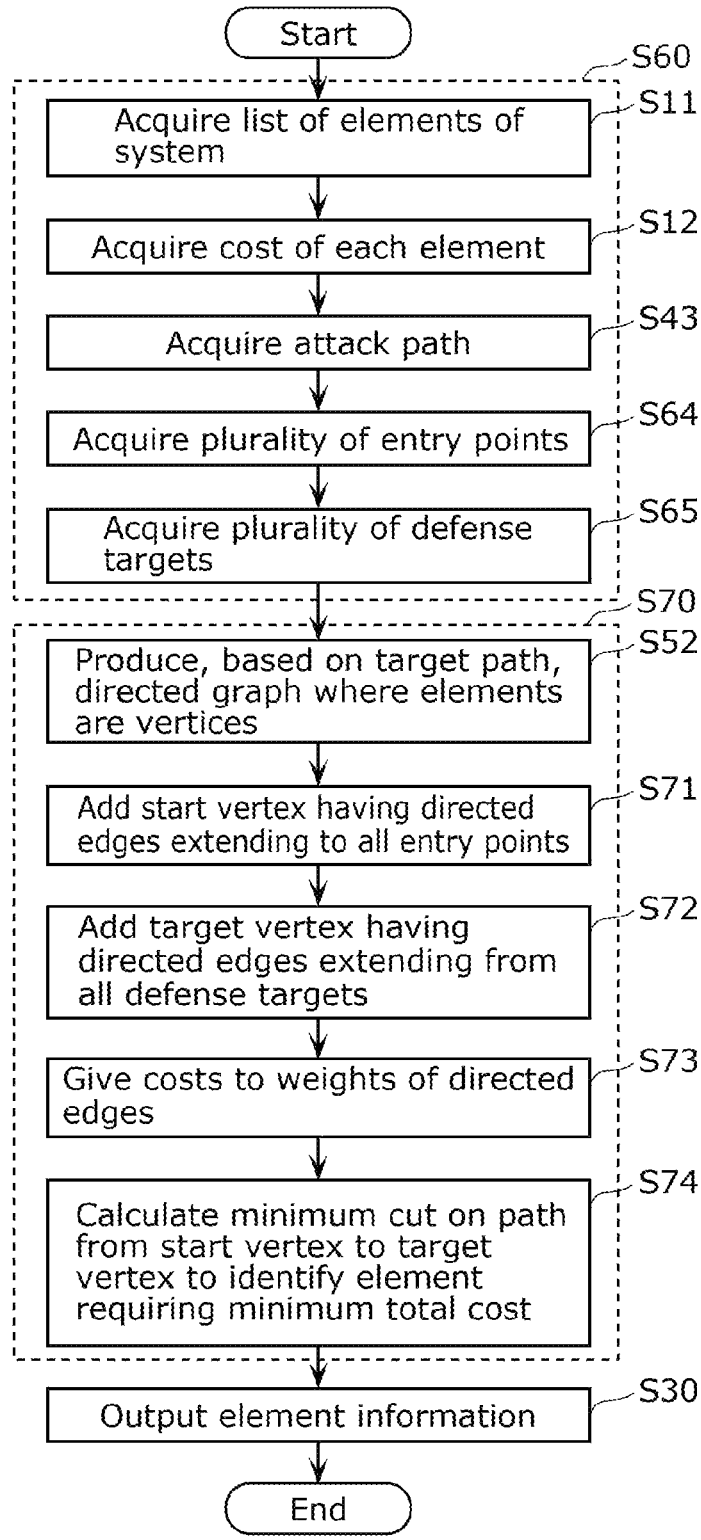
FIG. 13 is a flowchart showing the operation of a risk analyzer according to Embodiment 3.

FIG. 13 is a flowchart showing the operation of risk analyzer 100 according to the present embodiment. As shown in FIG. 13, inputter 110 first acquires the input information necessary for identifying the target element (S60). Specifically, inputter 110 acquires a list of the elements of the system (S11). Then, inputter 110 acquires the cost of each element (S12), and then acquires the attack path (S43). Furthermore, inputter 110 acquires a plurality of entry points (S64) and then acquires a plurality of defense targets (S65). As in Embodiment 1, the order in which inputter 110 acquires the pieces of information is not particularly limited.

Then, identifier 120 calculates the minimum cut based on the input information acquired by inputter 110 to identify the target element (S70). Specifically, identifier 120 first produces, as in Embodiment 2, based on the attack path, a directed graph in which the N elements are assumed to be vertices (S52).

Then, identifier 120 adds a start vertex which has directed edges extending to all the acquired entry points (S71). The start vertex is an example of a first additional element which is connected to only all the entry points.

Figure 14:
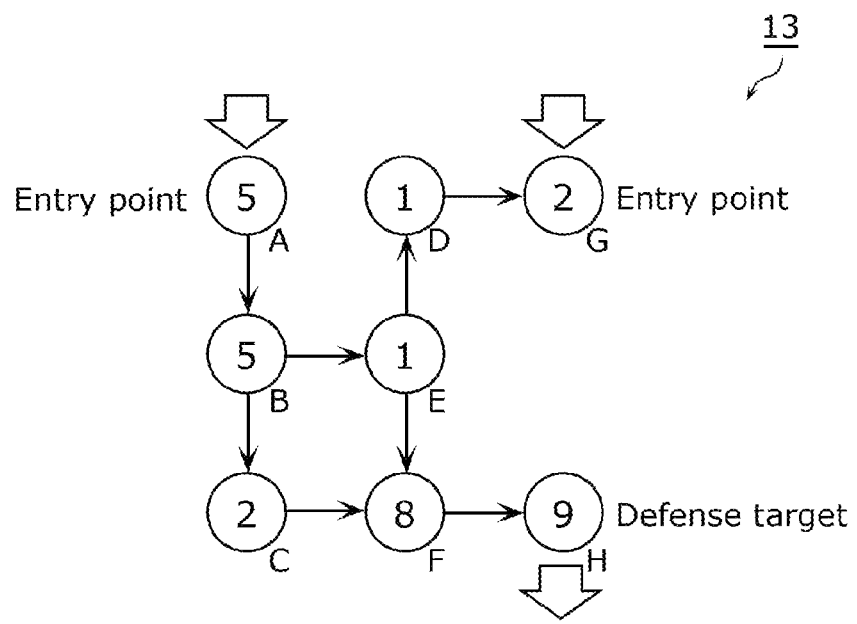
FIG. 14 is a diagram for illustrating a directed graph of a system which has a plurality of entry points.

FIG. 14 is a diagram for illustrating a directed graph of a system which has a plurality of entry points. Control system 13 shown in FIG. 14 is a control system formed with eight assets A to H connected to each other. Asset A and asset G are the entry points. Asset H is the defense target.

Figure 15:
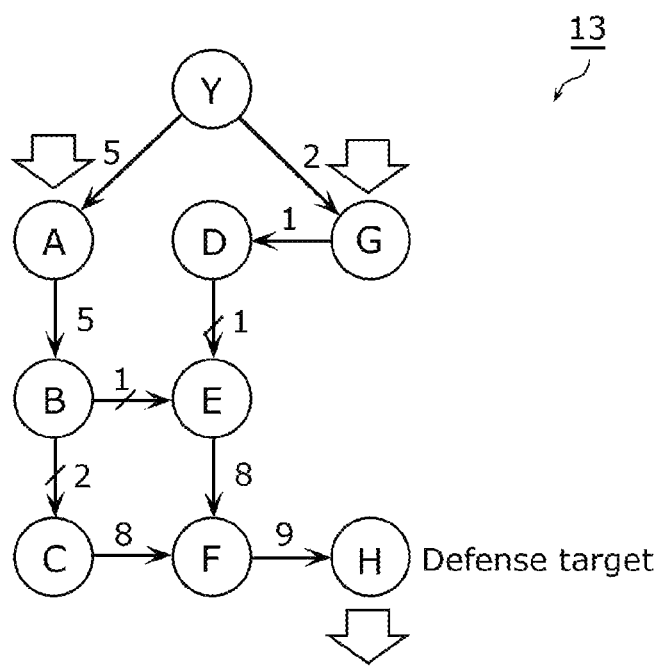
FIG. 15 is a diagram for illustrating a method for adding a start vertex to the directed graph shown in FIG. 14.

FIG. 15 is a diagram for illustrating a method for adding start vertex Y to the directed graph shown in FIG. 14. As shown in FIG. 15, identifier 120 adds start vertex Y connected to only a plurality of entry points of control system 13. Start vertex Y is connected to only asset A and asset G serving as the entry points.

Then, as shown in FIG. 13, identifier 120 adds a target vertex which has directed edges extending from all the acquired defense targets (S72). The target vertex is an example of a second additional element which is connected to only all the defense targets.

Figure 16:
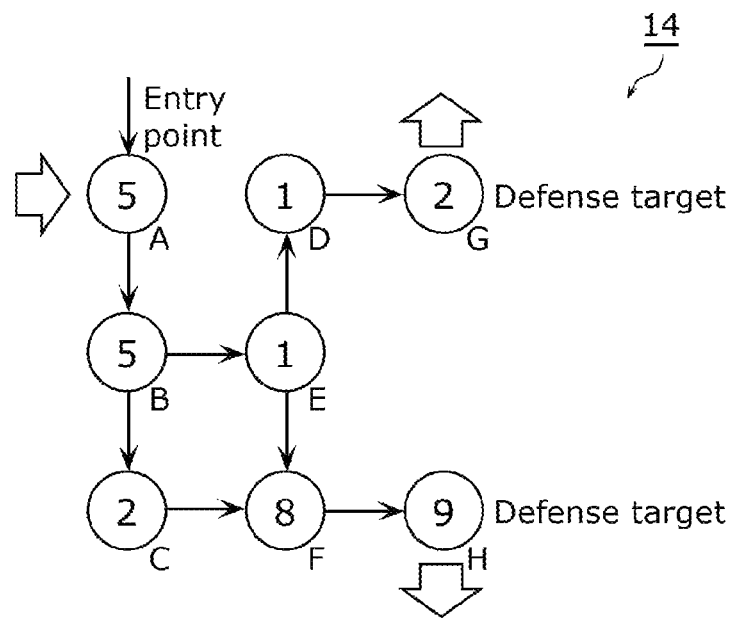
FIG. 16 is a diagram for illustrating a directed graph of a system which has a plurality of defense targets.

FIG. 16 is a diagram for illustrating a directed graph of a system which has a plurality of defense targets. Control system 14 shown in FIG. 16 is a control system formed with eight assets A to H connected to each other. Asset A is the entry point. Asset G and asset H are the defense targets.

Figure 17:
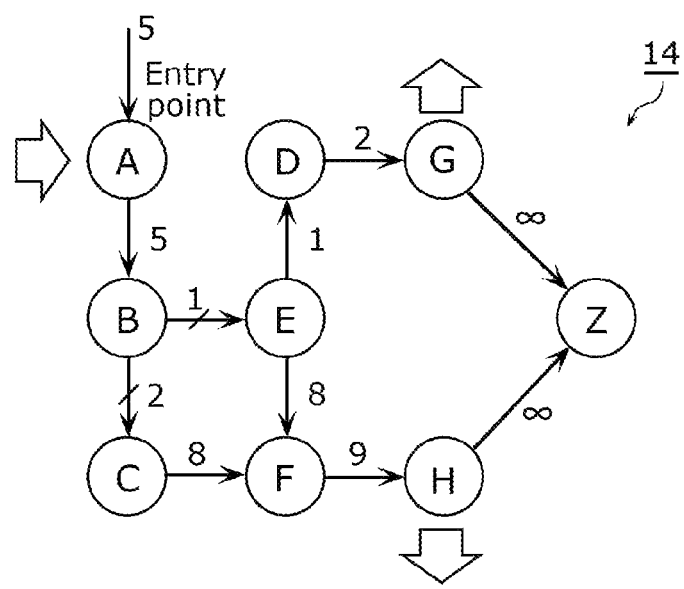
FIG. 17 is a diagram for illustrating a method for adding a target vertex to the directed graph shown in FIG. 16.

FIG. 17 is a diagram for illustrating a method for adding target vertex Z to the directed graph shown in FIG. 16. As shown in FIG. 17, identifier 120 adds target vertex Z connected to only a plurality of defense targets of control system 14. Defense target Z is connected to only asset G and asset H serving as the defense targets.

Then, as shown in FIG. 13, identifier 120 gives costs to the weights of directed edges (S73). Specifically, identifier 120 gives the cost of an asset to which a directed edge is connected to the directed edge. The same is true for the directed edges extending from start vertex Y. As shown in FIG. 15, 5 serving as the cost of asset A is given to the directed edge extending from start vertex Y to asset A. 2 serving as the cost of asset G is given to the directed edge extending from start vertex Y to asset G.

On the other hand, identifier 120 gives, to the directed edges connected to target vertex Z, values greater than or equal to costs given to the other directed edges. For example, identifier 120 gives, to all the directed edges connected to target vertex Z, values greater than or equal to the largest of the costs given to the other directed edges. As an example, as shown in FIG. 17, identifier 120 gives, to all the directed edges connected to target vertex Z, infinity (which is a value sufficiently larger than the others and which is the maximum value capable of being set).

In this way, a plurality of entry points are replaced by one start vertex Y for convenience, and a plurality of defense targets are replaced by one target vertex Z for convenience. In other words, the system which has a plurality of entry points and a plurality of defense targets can be replaced by the system in which start vertex Y is the entry point and target vertex Z is the defense target. Hence, as described in Embodiments 1 and 2, the minimum cut is derived as in the case where one entry point and one defense target are provided, and thus it is possible to identify the target element. The path extending from start vertex Y to target vertex Z certainly includes the target path input by inputter 110.

After start vertex Y and target vertex Z are added and the weights are given, as shown in FIG. 13, identifier 120 calculates the minimum cut on the path extending from start vertex Y to target vertex Z to identify, as the target element, an element requiring the minimum total cost (S74). Here, since the costs of the directed edges connected to target vertex Z are sufficiently large values, target vertex Z is prevented from being identified as the target element.

Although not shown in FIG. 15, the weights of edges input to start vertex Y can be set to infinity. In this way, start vertex Y is prevented from being identified as the target element.

Outputter 130 finally outputs the element information indicating the element identified by identifier 120 (S30).

As described above, in the present embodiment, when a plurality of entry points and a plurality of defense targets are input, identifier 120 adds the start vertex and the target vertex. Here, identifier 120 sets the cost of the target vertex to a value equal or greater than the costs of the N assets. Identifier 120 identifies, as the target element, one or more elements requiring the minimum total cost necessary for cutting off all paths including the target path and extending from the start vertex to the target vertex. In this way, regardless of the numbers of entry points and defense targets, the target element is identified, and thus it is possible to support feasible, sufficient security measures at low cost.

Although in the present embodiment, the example is described where both a plurality of entry points and a plurality of defense targets are acquired, only either of a plurality of entry points and a plurality of defense targets may be acquired. For example, when inputter 110 acquires a plurality of entry points and only one defense target, identifier 120 does not need to perform the processing (S72) for adding the target vertex. In this case, in step S74, identifier 120 calculates the minimum cut on the path extending from the start vertex to the defense target to identify an element requiring the minimum total cost. When inputter 110 acquires only one entry point and a plurality of defense targets, identifier 120 does not need to perform the processing (S71) for adding the start vertex. In this case, in step S74, identifier 120 calculates the minimum cut on the path extending from the entry point to the target vertex to identify an element requiring the minimum total cost.

Embodiment 4

Embodiment 4 will then be described.

In Embodiments 1 to 3, the example is described where measures for increasing the degree of safety can be taken for all the assets of the control system. However, depending on the control system, it is likely that, for example, when an asset is an old facility, it is difficult to take measures for increasing the degree of safety or an asset for which measures for increasing the degree of safety cannot be taken is included. In Embodiment 4, a description will be given of a case where a system includes an element for which it is difficult to take measures on security. Differences from Embodiments 1 to 3 will be mainly described below, and the description of the same parts will be omitted or simplified.

The configuration of a risk analyzer according to the present embodiment is the same as that of risk analyzer 100 according to Embodiment 1. The following description is based on risk analyzer 100 shown in FIG. 2.

Figure 18:
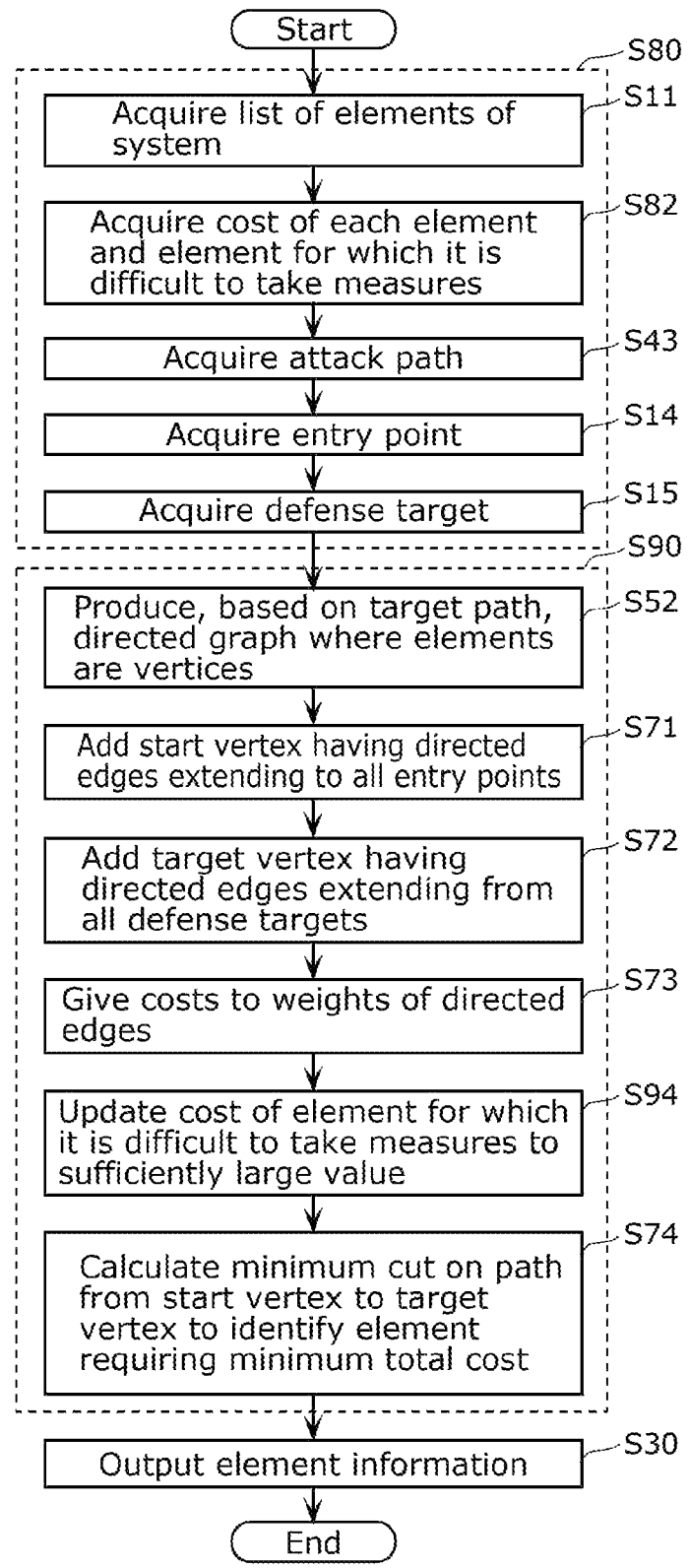
FIG. 18 is a flowchart showing the operation of a risk analyzer according to Embodiment 4.

FIG. 18 is a flowchart showing the operation of risk analyzer 100 according to the present embodiment.

As shown in FIG. 18, inputter 110 first acquires the input information necessary for identifying the target element (S80). Specifically, inputter 110 acquires a list of the elements of the system (S11). Then, inputter 110 acquires the cost of each element and information indicating an element for which it is difficult to take measures (S82), and then acquires the attack path (S43). Furthermore, inputter 110 acquires the entry point (S14) and then acquires the defense target (S15). As in Embodiment 1, the order in which inputter 110 acquires the pieces of information is not particularly limited.

The element for which it is difficult to take measures is an element for which it is difficult to take measures for increasing the degree of safety or for which measures for increasing the degree of safety cannot be taken. The element for which it is difficult to take measures not only means an element for which it is difficult to take physical measures or for which physical measures cannot be taken but also may include an element for which measures should not be taken. For example, an asset for which measures for increasing the degree of safety should not be taken so that the availability of the control system is maintained is also an example of the element for which it is difficult to take measures. In other words, an asset whose cost is low may be the element for which it is difficult to take measures. There may be a plurality of elements for which it is difficult to take measures. For example, in a system formed with the N elements, an M (M is a natural number) element is the element for which it is difficult to take measures.

Then, identifier 120 calculates the minimum cut based on the input information acquired by inputter 110 to identify the target element (S90). Specifically, identifier 120 first produces, based on the attack path, a directed graph in which the N elements are assumed to be vertices (S52). Directed edges connecting the vertices are determined based on the attack path.

Figure 19:
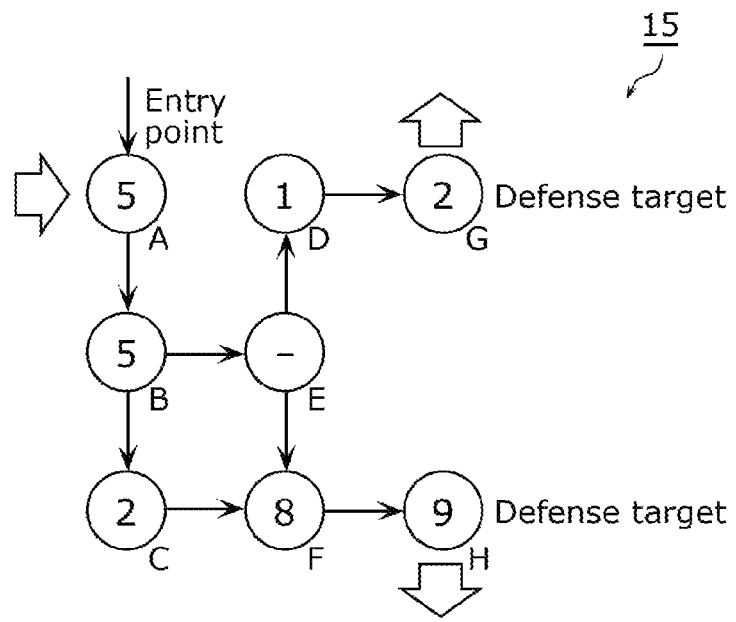
FIG. 19 is a diagram for illustrating a directed graph of a system that has an element for which it is difficult to take measures.

For example, identifier 120 produces a directed graph as shown in FIG. 19. Since in the input information, a cost is made to correspond to each element, identifier 120 produces the directed graph with weights (costs) given to the vertices.

Here, FIG. 19 is a diagram for illustrating the directed graph of a system which has an element for which it is difficult to take measures. In an example shown in FIG. 19, control system 15 is a control system formed with eight assets A to H connected to each other. Asset A is the entry point. Asset G and asset H are the defense targets. Asset E is the asset for which it is difficult to take measures. For example, asset E is an old control device in which an OS is not supported or the like, and even when a sufficient cost is spent, it is difficult or impossible to increase the degree of safety of asset E. In FIG. 19, in order to indicate that it is difficult to take measures for asset E, the weight of the vertex indicating asset E is represented by - (dash).

In the example shown in FIG. 19, one entry point and a plurality of defense targets are provided. Hence, identifier 120 omits the processing (S71) for adding the start vertex, and as in Embodiment 4 as shown in FIG. 18, identifier 120 adds target vertex Z (S72) and thereafter gives costs to the weights of directed edges (S73).

Figure 20:
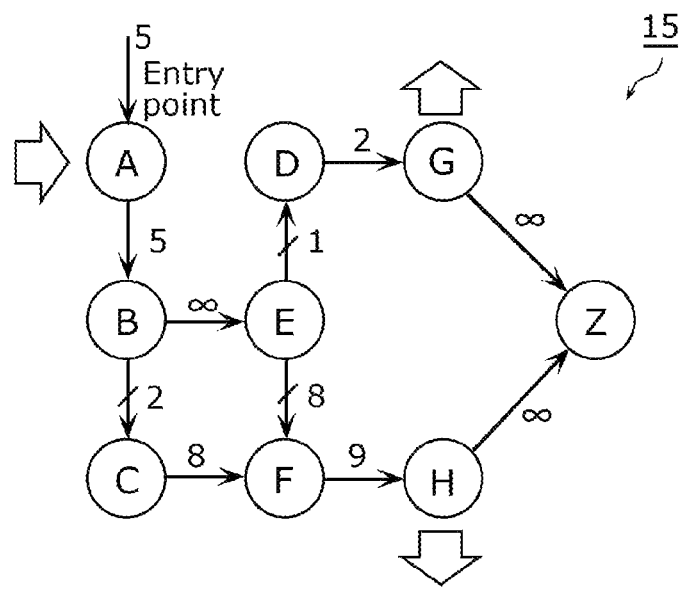
FIG. 20 is a diagram for illustrating processing, on the directed graph shown in FIG. 19, for updating the weight of a directed edge connected to the element for which it is difficult to take measures.

Then, identifier 120 updates the cost of the M element for which it is difficult to take measures to a sufficiently large value (S94). Here, FIG. 20 is a diagram for illustrating processing, on the directed graph shown in FIG. 19, for updating the weight of a directed edge connected to the element for which it is difficult to take measures. For example, identifier 120 updates the cost of the directed edge connected to asset E shown in FIG. 19 to a sufficiently large value. As an example, as shown in FIG. 20, the cost of the directed edge connected from asset B to asset E is updated to infinity.

The updated value is a predetermined value larger than any of the costs of the remaining N-M elements obtained by removing the M element for which it is difficult to take measures. The updated value is equal to, for example, the cost given to the directed edge connected to target vertex Z, and is greater than or equal to the largest of the costs given to the other directed edges.

After the updating of the cost, as shown in FIG. 18, identifier 120 calculates the minimum cut on the path extending from start vertex Y to target vertex Z to identify, as the target element, an element requiring the minimum total cost (S74). In an example shown in FIG. 20, the minimum cut is calculated on the path extending from asset A to target vertex Z. For example, identifier 120 identifies asset C, asset D, and asset F as the target elements. Here, the cost of the directed edge connected from asset B to asset E is a sufficiently large value, and thus asset E is prevented from being selected as the target element.

Outputter 130 finally outputs the element information indicating the element identified by identifier 120 (S30).

As described above, in risk analyzer 100 according to the present embodiment, the element for which it is difficult to take measures is not identified as the target element, and thus it is possible to support feasible security measures.

Although the example is described where inputter 110 acquires the information indicating the element for which it is difficult to take measures, there is no limitation on this example. For example, identifier 120 may identify, based on the costs of the elements, the element for which it is difficult to take measures. For example, identifier 120 may compare the cost of the element with a threshold value to identify the element whose cost is larger than the threshold value as the cost for which it is difficult to take measures.

Embodiment 5

Embodiment 5 will then be described.

In Embodiments 1 to 4, the example is described where the cost of an element is such a cost that the degree of safety of the element can be sufficiently increased to be greater than or equal to the second threshold value and that thus it is possible to cut off an attack path passing through the element. By contrast, in Embodiment 5, the cost is a cost necessary for slightly increasing the degree of safety of the element. Differences from Embodiments 1 to 4 will be mainly described below, and the description of the same parts will be omitted or simplified.

The configuration of a risk analyzer according to the present embodiment is the same as that of risk analyzer 100 according to Embodiment 1. The following description is based on risk analyzer 100 shown in FIG. 2.

Figure 21:
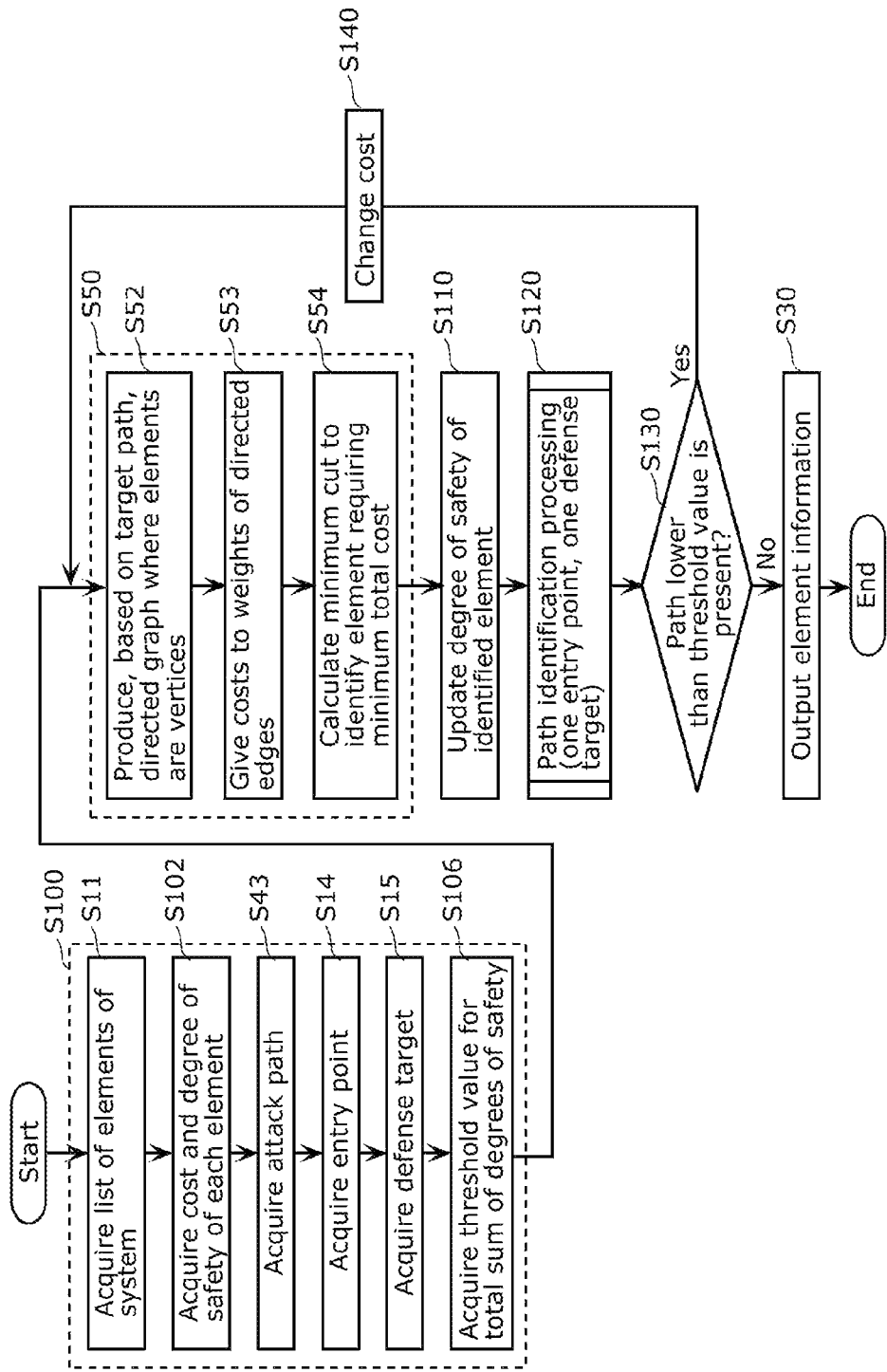
FIG. 21 is a flowchart showing the operation of a risk analyzer according to Embodiment 5.

FIG. 21 is a flowchart showing the operation of risk analyzer 100 according to the present embodiment.

As shown in FIG. 21, inputter 110 first acquires the input information necessary for identifying the target element (S100). Specifically, inputter 110 acquires a list of the elements of the system (S11). Then, inputter 110 acquires the cost and the degree of safety of each element (S102), and then acquires the attack path (S43). Furthermore, inputter 110 acquires the entry point (S14) and then acquires the defense target (S15). Then, inputter 110 acquires a third threshold value for a total sum of the degrees of safety (S106). As in Embodiment 1, the order in which inputter 110 acquires the pieces of information is not particularly limited.

The third threshold value acquired by inputter 110 is a value used for comparison with a total sum of the degrees of safety of elements passed while the path extends from the entry point to the defense target. The third threshold value is a safety criterion which needs to be satisfied by the path extending from the entry point to the defense target. When the total sum of the degrees of safety is greater than or equal to the third threshold value, the path is safe, and the security of an asset serving as the defense target is sufficiently high. In other words, it can be determined that it is not necessary to take measures against a threat to security. When the total sum of the degrees of safety is less than the third threshold value, the path cannot be said to be safe, and the security of the asset serving as the defense target is low. In other words, it can be determined that it is necessary to take measures against the threat to security.

As in Embodiment 1, the cost of each element is a measure cost necessary for increasing the degree of safety to the first threshold value or more. The first threshold value here may be less than the second threshold value serving as a criterion which needs to be satisfied for achieving a state where the safety of an element is sufficiently high. For example, the cost may be a cost necessary for slightly increasing the degree of safety of the element. Specifically, even when the cost is spent on one element, it is not necessary that the attack path can be cut off in the element. For example, costs are gradually spent on a plurality of elements on the target path to be able to increase the degree of safety of the target path as a whole and to thereby increase the security of the defense target.

Then, identifier 120 calculates the minimum cut based on the input information acquired by inputter 110 to identify the target element (S50). Specific processing for identifying the target element is the same as in Embodiment 2.

Then, identifier 120 updates the degree of safety of the identified target element (S110). Specifically, identifier 120 updates the degree of safety of the target element to the degree of safety increased by spending the cost. For example, when the cost of the target element is a cost for increasing the degree of safety by 1 and the degree of safety before being updated is 1, identifier 120 updates the degree of safety to 2.

Figure 22:
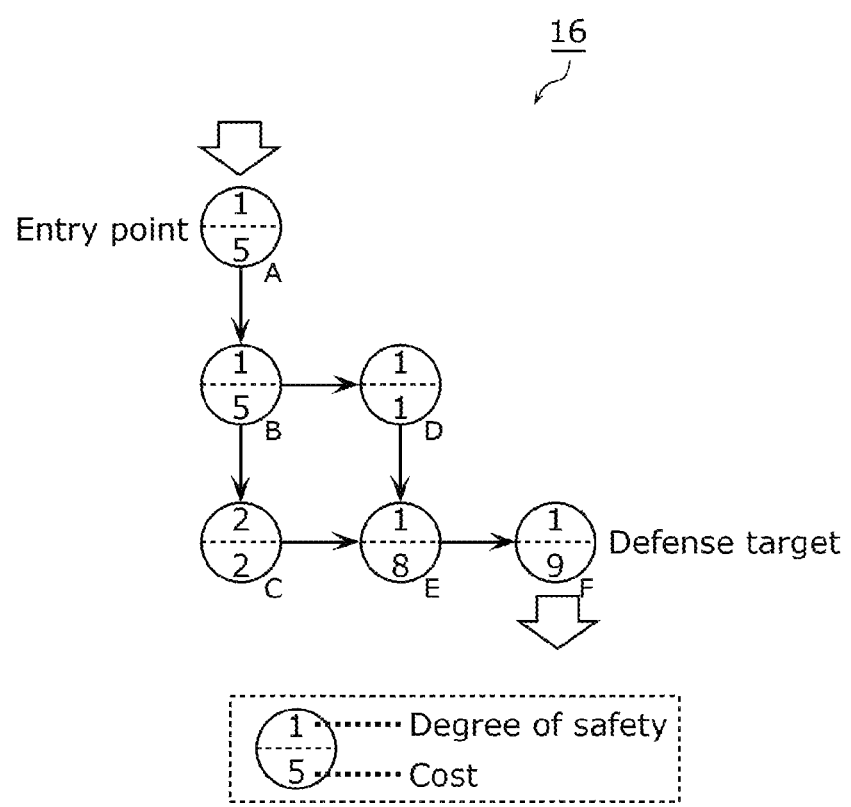
FIG. 22 is a diagram which is produced based on input information in the risk analyzer according to Embodiment 5 and which is used for illustrating a directed graph of a system serving as the target of a risk analysis.

Here, FIG. 22 is a diagram which is produced based on the information input to risk analyzer 100 according to the present embodiment and which is used for illustrating a directed graph of control system 16 serving as the target of a risk analysis. In an example shown in FIG. 22, control system 16 is a control system formed with six assets A to F connected to each other. Asset A is the entry point. Asset F is the defense target. In FIG. 22, the degree of safety (upper value) and the cost (lower value) of each element are shown. In processing for identifying the target path, the degree of safety is utilized as the weight of the vertex.

Figure 23:
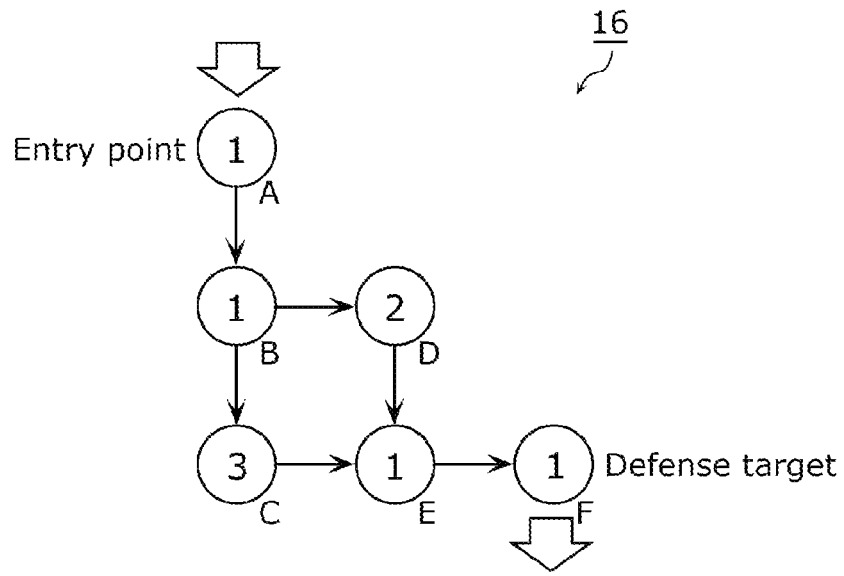
FIG. 23 is a diagram for illustrating processing for updating the degrees of safety of elements based on the system shown in FIG. 22.

In the example shown in FIG. 22, asset C and asset D are identified as the target elements. Hence, identifier 120 updates the degrees of safety of asset C and asset D. For example, as shown in FIG. 23, the degrees of safety of asset C and asset D each are increased by 1, and thus the degree of safety of asset C is updated to 3 and the degree of safety of asset D is updated to 2. FIG. 23 is a diagram for illustrating processing for updating the degrees of safety of the elements based on the system shown in FIG. 22.

After the degrees of safety are updated, identifier 120 performs processing for identifying the target path (S120). The processing shown in step S120 is processing for identifying the target path when one entry point and one defense target alone are provided.

Figure 24:
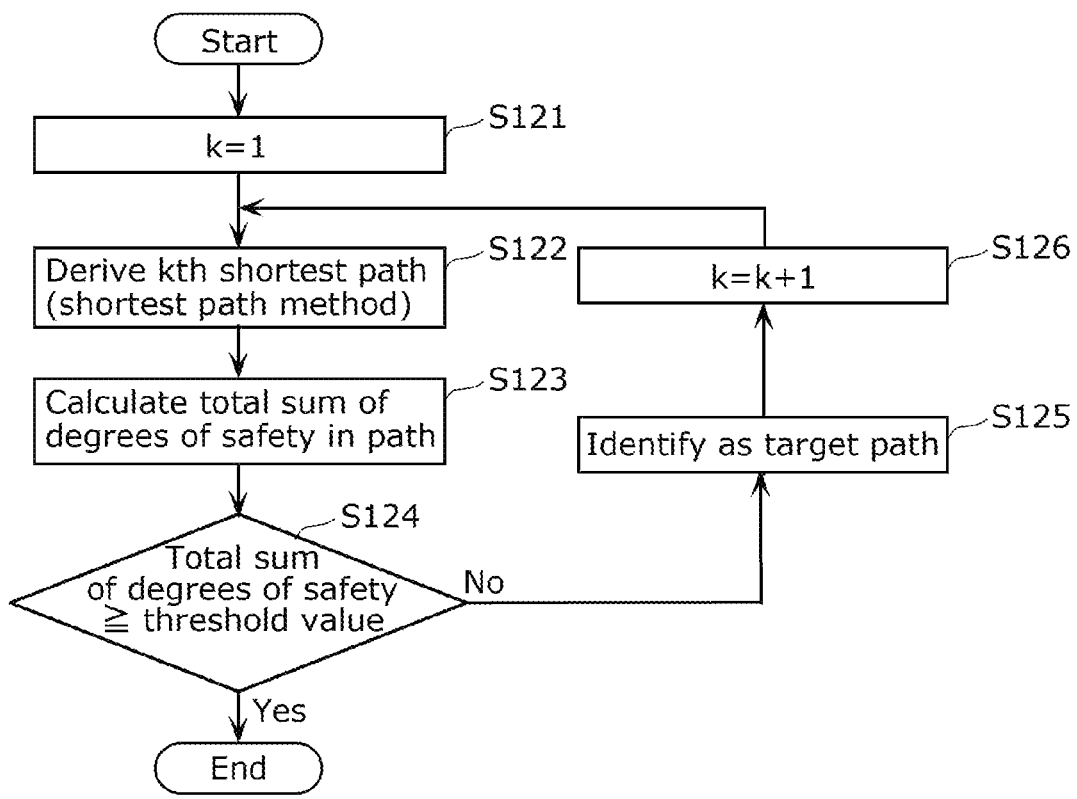
FIG. 24 is a flowchart showing processing for identifying a target path in the operation of the risk analyzer according to Embodiment 5.

FIG. 24 is a flowchart showing the processing (S120) for identifying the target path in the operation of risk analyzer 100 according to the present embodiment.

As shown in FIG. 24, identifier 120 first makes a setting such that k=1 (S121). Identifier 120 uses a shortest path method to derive the kth shortest path among paths extending from the entry point to the defense target (S122) and to calculate a total sum of the degrees of safety of the derived path (S123).

Specifically, identifier 120 produces, based on the input information acquired by inputter 110, a directed graph in which the N assets are assumed to be vertices and in which the degrees of safety of the updated assets are assumed to be the weights of the vertices. Directed edges between the vertices in the directed graph are determined based on the attack path which is an example of the connection relationship of the N assets. For example, identifier 120 produces the directed graph as shown in FIG. 23.

Then, identifier 120 gives weights to the directed edges. Based on the directed graph, identifier 120 uses the shortest path method to identify, as the target path, a path in which a total sum of the degrees of safety of all assets located on the path is the kth smallest among all the paths extending from the entry point to the defense target. Here, since k=1, identifier 120 identifies, as the target path, a path in which the total sum of the degrees of safety is the smallest among all the paths extending from the entry point to the defense target.

FIG. 25 is a diagram showing the target path identified in control system 16 shown in FIG. 23. In FIG. 25, the identified target path is represented by double lines. Here, a case where the third threshold value used for comparison with the total sum of the degrees of safety is 7 is shown. Specifically, the path in which the total sum of the degrees of safety is lower than 7 is identified as the target path.

As shown in (a) of FIG. 25, the total sum of the degrees of safety in path 40 where asset A, asset B, asset D, asset E, and asset F are shown in this order is 6. In control system 16, path 40 is a path in which the total sum of the degrees of safety is the smallest. In control system 16 shown in FIG. 25, the path in which the total sum of the degrees of safety is 6 is only path 40.

Then, as shown in FIG. 24, identifier 120 compares the total sum of the degrees of safety with the third threshold value (S124). Specifically, when the total sum of the degrees of safety is lower than the third threshold value (No in S124), identifier 120 identifies, as the target path, the derived path, that is, the path in which the total sum of the degrees of safety is lower than the third threshold value (S125). Then, identifier 120 increases the value of k by 1 (S126) to sequentially perform the derivation of the shortest path, the calculation of the total sum of the degrees of safety, and the comparison with the third threshold value (S122 to S124). Until the total sum of the degrees of safety is greater than or equal to the third threshold value (Yes in S124), as the value of k is increased by 1, steps S122 to S124 are repeated. In this way, among the paths extending from the entry point to the defense target, all the paths in which the total sum of the degrees of safety is lower than the third threshold value can be identified as the target paths.

For example, the total sum of the degrees of safety in path 40 shown in (a) of FIG. 25 is 6 and is lower than 7 which is the third threshold value. Hence, identifier 120 sets the value of k to 2 to identify, as the target path, the second shortest path, that is, a path in which the total sum of the degrees of safety is the second smallest among all the paths extending from the entry point to the defense target. In this way, as shown in (b) of FIG. 25, the total sum of the degrees of safety in path 41 where asset A, asset B, asset C, asset E, and asset F are shown in this order is 7 and is greater than or equal to the third threshold value, and thus identifier 120 does not identify path 41 as the target path.

The target path from the entry point to the defense target is identified based on the degrees of safety after being updated, and thereafter as shown in FIG. 21, identifier 120 determines whether or not the target path in which the total sum of the degrees of safety is lower than the third threshold value is identified (S130). When the path in which the total sum of the degrees of safety is lower than the third threshold value is present (Yes in S130), identifier 120 changes the cost of the target element (S140). Specifically, identifier 120 changes the cost of the target element to a cost for further increasing the degree of safety of the target element. For example, when the cost before being changed is a cost necessary for increasing the degree of safety by 1, identifier 120 changes the cost to a cost necessary for increasing the degree of safety by 2. Thereafter, identifier 120 repeats the identification of the target element (S50), the processing for updating the degree of safety (S110) and the processing for identifying the target path (S120) until the target path in which the total sum of the degrees of safety is lower than the third threshold value is not identified.

When the target path in which the total sum of the degrees of safety is lower than the third threshold value is not identified (No in S130), outputter 130 outputs the element information indicating the identified target element (S30).

As described above, in risk analyzer 100 according to the present embodiment, even when costs necessary for increasing the degrees of safety of individual elements are low, an element on which a cost needs to be spent in order to lower the total sum of the degrees of safety in the path extending from the entry point to the defense target can be identified as the target element. In this way, in risk analyzer 100 according to the present embodiment, it is possible to support feasible, sufficient security measures at lower cost.

In the present embodiment, when the shortest path method is used, only the processing for the case where k=1 may be performed. The total sum of the degrees of safety in the path identified when k=1 is the lowest among all the paths extending from the entry point to the defense target. Hence, when k=1 and the total sum of the degrees of safety is greater than or equal to the third threshold value, the total sum of the degrees of safety in the other paths is greater than or equal to the third threshold value. Hence, after the calculation of the total sum of the degrees of safety when k=1 (S123 in FIG. 24), the determination in step S130 shown in FIG. 21 may be performed.

When a plurality of pieces are provided for at least one of the entry point and the defense target, identifier 120 identifies the target path for each of combinations between the entry point and the defense target. Specifically, identifier 120 selects one of a plurality of entry points, selects one of a plurality of defense targets, and identifies the target path by performing steps S121 to S126 based on the selected entry point and the selected defense target. Until an unselected entry point and an unselected defense target are not found, steps S121 to S126 are repeated, and thus paths extending from a plurality of entry points to a plurality of defense targets can be identified.

Embodiment 6

Embodiment 6 will then be described.

In Embodiments 1 to 5, the example is described where the system serving as the target of the risk analysis performed by risk analyzer 100 is the control system and where the assets of the control system are an example of the elements. By contrast, in Embodiment 6, an example will be described where the system serving as the target of the risk analysis is an attack procedure for assets and where N attack steps included in the attack procedure are an example of the N elements. Differences from Embodiment 1 will be mainly described below, and the description of the same parts will be omitted or simplified.

The configuration and operation of a risk analyzer according to the present embodiment are the same as those of risk analyzer 100 according to Embodiment 1. As described above, the present embodiment differs from Embodiment 1 in the system serving as the target of the risk analysis. The following description is based on risk analyzer 100 shown in FIG. 2.

Figure 26:
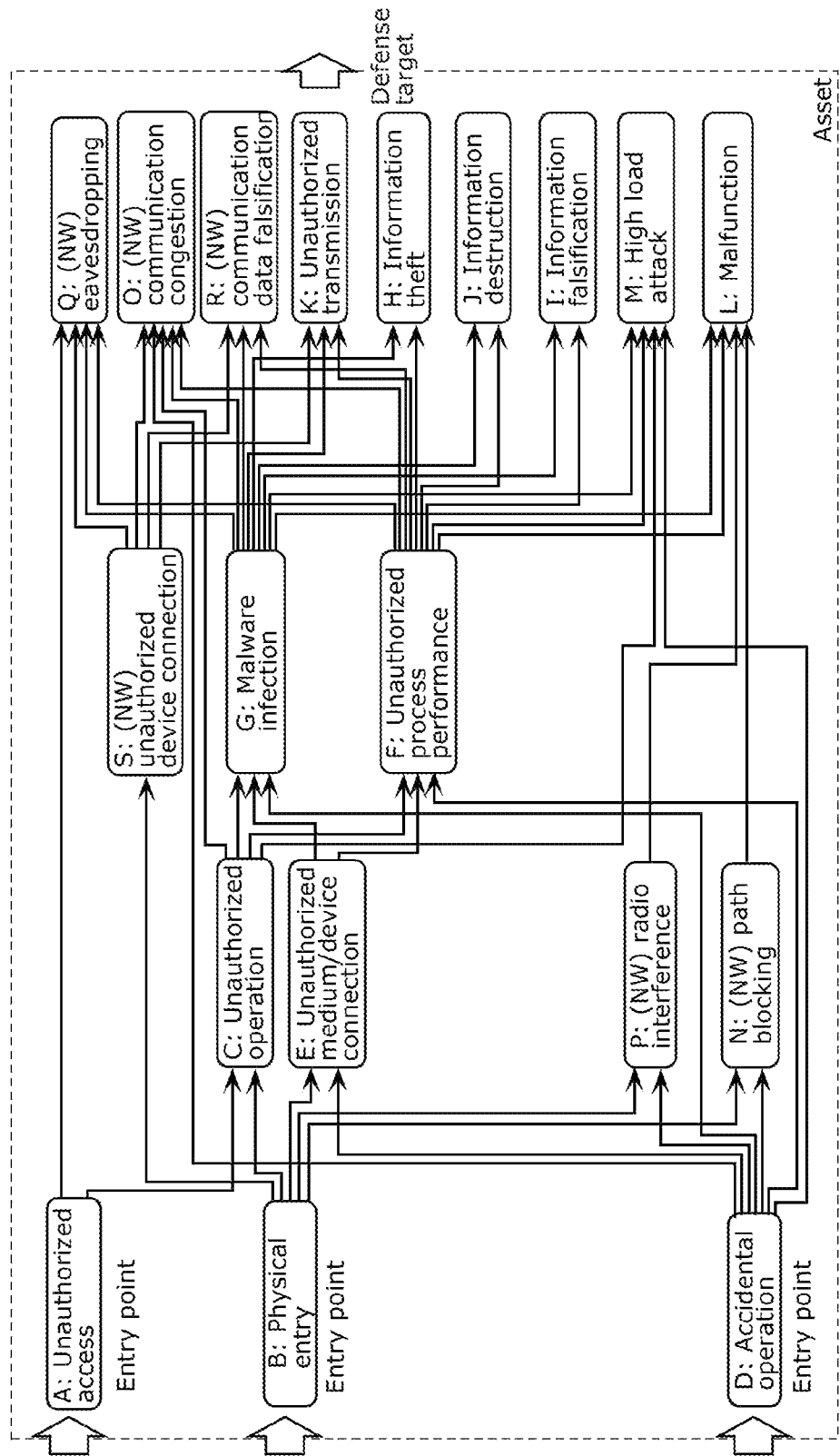
FIG. 26 is a diagram showing an example of a system which is the target of a risk analysis performed by a risk analyzer according to Embodiment 6.

FIG. 26 is a diagram showing an example of the system serving as the target of the risk analysis performed by risk analyzer 100 according to the present embodiment. Specifically, FIG. 26 is a diagram showing an attack procedure for one of the assets of a control system.

The attack procedure for one asset includes a plurality of attack steps. The attack steps are threats used in the risk analysis. Examples of the attack steps include 19 attack steps which are A: unauthorized access, B: physical entry, C: unauthorized operation, D: accidental operation, E: unauthorized medium/device connection, F: unauthorized process performance, G: malware infection, H: information theft, I: information falsification, J: information destruction, K: unauthorized transmission, L: malfunction, M: high load attack, N: path blocking, O: communication congestion, P: radio interference, Q: eavesdropping, R: communication data falsification, and S: unauthorized device connection.

As shown in FIG. 26, the attack step is associated with other attack steps. For example, in order to perform the attack step of F: unauthorized process performance, it is necessary to perform such an attack step after any one of the attack steps of C: unauthorized operation, D: accidental operation, and E: unauthorized medium/device connection is performed. In other words, when F: unauthorized process performance attempts to be performed on the asset, the attack step which needs to be performed before F: unauthorized process performance is present. As described above, a plurality of attack steps have an order relationship, that is, a directed connection relationship. In FIG. 26, the order relationship is represented by arrows.

In the present embodiment, inputter 110 receives, as inputs, the costs of all the attack steps included in the attack procedure for the asset, the order relationship of the attack steps, entry points which are attack steps serving as entries to the asset, and defense targets which are attack steps to be protected in the asset. The costs, the order relationship, the entry points, and the defense targets each are objectively determined based on a predetermined method.

In risk analyzer 100 according to the present embodiment, when the risk analysis on the asset is performed, identifier 120 produces a directed graph in which all the attack steps included in the attack procedure for the asset are assumed to be vertices and in which the order relationship of the attack steps is assumed to be directed edges. The costs of the attack steps are allocated to the directed edges as weights. Specifically, the connection destination of the directed edge, that is, the cost of the subsequent attack step in the order relationship is allocated. For example, the cost of C: unauthorized operation is allocated as a weight to the directed edge extending from A: unauthorized access to C: unauthorized operation.

After the directed graph is produced and weights are given to the directed edges, as in Embodiment 1 or 2, identifier 120 calculates the minimum cut to identify, as the target element (target step), such an attack step that a minimum total cost necessary for cutting off the attack procedure extending from the entry points to the defense targets is required. In FIG. 26, as the entry points, three attack steps (specifically, A: unauthorized access, B: physical entry, and D: accidental operation) are input. Hence, identifier 120 performs step S70 along the flowchart shown in FIG. 13 to identify the target element.

As described above, in the present embodiment, it is possible to perform the risk analysis on the attack procedure for the assets of the control system, and thus it is possible to support sufficient measures for increasing the security of the defense targets.

Embodiment 7

Embodiment 7 will then be described.

Embodiment 7 corresponds to a combination of Embodiment 1 or 2 and Embodiment 6. Specifically, a connection relationship between a plurality of assets is established based on the connection relationship of attack steps included in an attack procedure for each of the assets. More specifically, a plurality of attack steps included in an attack procedure for each of a plurality of assets of a control system are an example of the N elements. Differences from Embodiments 1, 2 and 6 will be mainly described below, and the description of the same parts will be omitted or simplified.

The configuration and operation of a risk analyzer according to the present embodiment are the same as those of risk analyzer 100 according to Embodiment 1. As described above, the present embodiment differs from Embodiment 1 in the system serving as the target of the risk analysis. The following description is based on risk analyzer 100 shown in FIG. 2.

Figure 27:
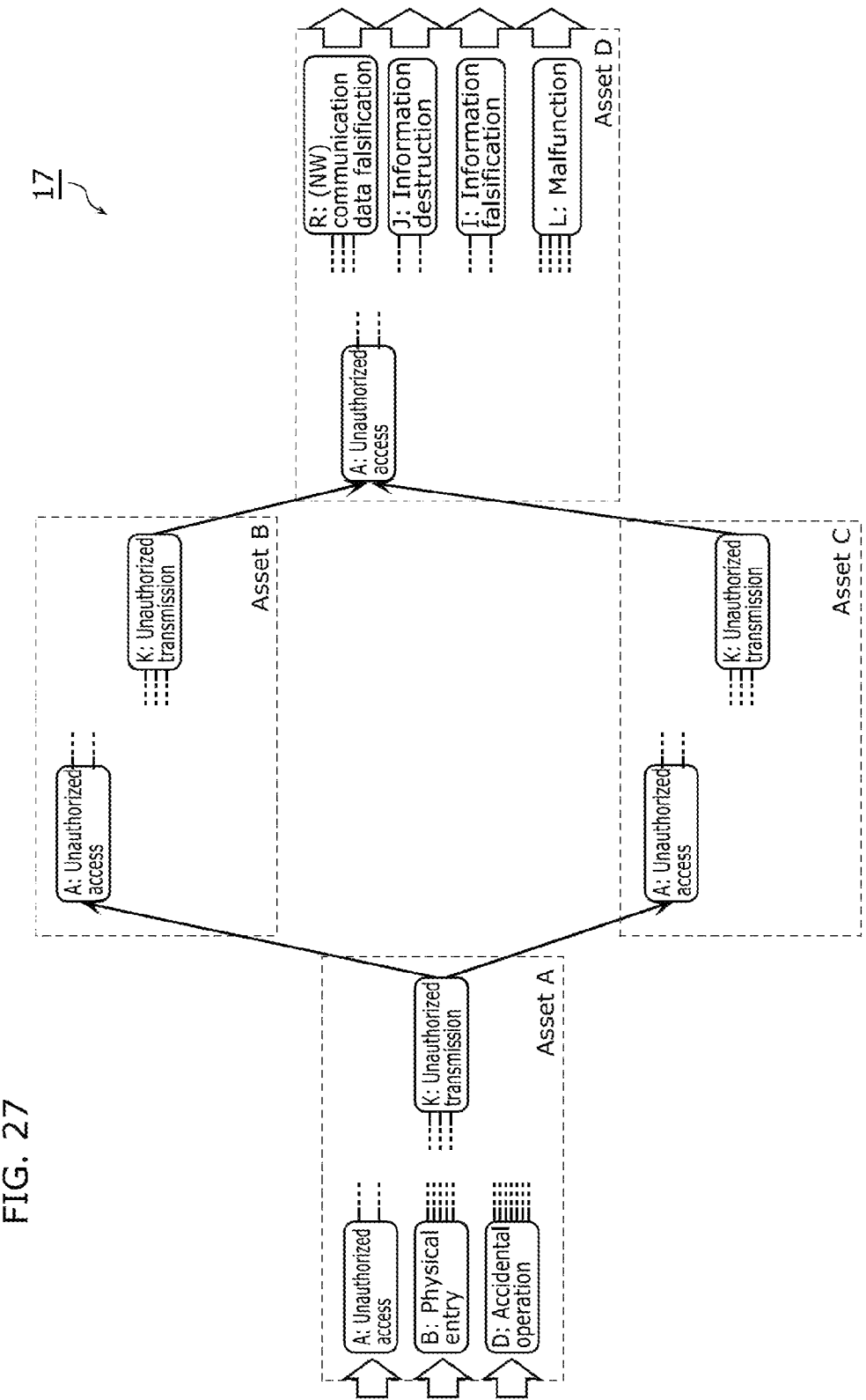
FIG. 27 is a diagram showing an example of a system which is the target of a risk analysis performed by a risk analyzer according to Embodiment 7.

FIG. 27 is a diagram showing an example of the system serving as the target of the risk analysis performed by risk analyzer 100 according to the present embodiment. Specifically, FIG. 27 shows four assets A to D of control system 17 and an attack procedure for each of four assets A to D. Although not shown in FIG. 27 in order to prevent the figure from being complicated, the attack procedure for each of four assets A to D includes the 19 attack steps shown in FIG. 26.

As shown in FIG. 27, asset A is connected to each of asset B and asset C. Asset D is connected to each of asset B and asset C. The connection relationship of assets A to D is directed. Asset A is the entry point, and asset D is the defense target.

In this case, as shown in FIG. 27, when consideration is given to the attack procedure for asset A serving as the entry point, three attack steps of A: unauthorized access, B: physical entry, and D: accidental operation included in the attack procedure for asset A are entry points. When an attack on asset B attempts to be performed after the success of an attack on asset A, K: unauthorized transmission which is an attack step for asset A is utilized, and thus an attack is started from A: unauthorized access which is an attack step for asset B. As described above, the attack procedure from asset A to asset B is determined in a combination of the attack steps in asset A and asset B. For example, even when only J: information destruction which is an attack step for asset A occurs, an attack on asset B is not achieved. After an attack on asset A, the attack of B: physical entry on asset B is not performed. Hence, the connection relationship of the assets of control system 17 can be indicated by the connection relationship of the attack steps included in the attack procedures for the assets.

In risk analyzer 100 according to the present embodiment, when the risk analysis on the assets is performed, identifier 120 produces a directed graph in which all the attack steps included in the attack procedures for all the assets of control system 17 are assumed to be vertices and in which the order relationship of the attack steps is assumed to be directed edges. For example, when each of assets A to D includes the 19 attack steps shown in FIG. 26, the number of vertices in the directed graph is 76 (=19×4). The costs of the attack steps are allocated to the directed edges as weights. A method for allocating the costs is the same as in Embodiment 6.

After the directed graph is produced and the weights are given to the directed edges, as in Embodiment 1 or 2, identifier 120 calculates the minimum cut to identify, as the target element (target step), such an attack step that a minimum total cost necessary for cutting off the attack procedure extending from the entry point to the defense target is required. In FIG. 27, as the entry points, three attack steps (specifically, A: unauthorized access, B: physical entry, and D: accidental operation) in asset A are input. As the defense targets, four attack steps (specifically, I: information falsification, J: information destruction, L: malfunction, and R: communication data falsification) in asset D are input. Hence, identifier 120 performs step S70 along the flowchart shown in FIG. 13 to identify the target path.

As described above, in the present embodiment, it is possible to perform the risk analysis on the attack procedures for all the assets of control system 17, and thus it is possible to support sufficient measures for increasing the security of the defense targets.

Although in the present embodiment, the example is described where all the attack steps included in the attack procedures for four assets A to D of control system 17 are elements, attack steps included in an attack procedure only for at least one of four assets A to D and one or more assets with no consideration given to the attack procedure may be elements.

Other Embodiments

Although the risk analyzer and the risk analysis method according to one or a plurality of aspects are described above based on the embodiments, the present disclosure is not limited to these embodiments. Different types of variations conceived by those skilled in the art on the present embodiment and embodiments formed by combining constituent elements in different embodiments are also included within a range of the present disclosure without departing from the spirit of the present disclosure.

For example, when inputter 110 acquires the degrees of safety of elements, identifier 120 may identify, based on the degrees of safety which are acquired, a path vulnerable to an attack as the target path. In other words, identifier 120 may identify the target path based on the degrees of safety among all paths extending from the entry point to the defense target determined based on the connection relationship. As a method for identifying the target path in this case, the shortest path method can be used as in step S120 of Embodiment 5. Identifier 120 may identify the target element based on the identified target path.

For example, although in the embodiments described above, the example is described where the degree of safety means that as its value is increased, safety against a threat to security is increased, there is no limitation on this example. The degree of safety may mean that as its value is increased, safety against a threat to security is lowered. In this case, the degree of safety can be replaced by the degree of risk indicating the level of risk. Inputter 110 may receive, as an input, the degree of risk which indirectly indicates, as the degree of safety, safety against a threat to security. The degree of risk has a negative correlation with the degree of safety described in the embodiments.

For example, although in Embodiments 3 to 5, the example is described where inputter 110 acquires the attack path, in each of the embodiments, as in Embodiment 1, inputter 110 may acquire the connection relationship of all the elements of the system.

In the embodiments described above, processing performed by a specific processor may be performed by another processor. The order of a plurality of types of processing may be changed or a plurality of types of processing may be performed simultaneously. For example, at least one of inputter 110, identifier 120, and outputter 130 in risk analyzer 100 may be included in another device.

In this case, a communication method between devices is not particularly limited. When wireless communication is performed between the devices, a wireless communication system (communication standard) is, for example, near field wireless communication such as ZigBee (registered trademark), Bluetooth (registered trademark), or a wireless local area network (LAN). The wireless communication system (communication standard) may also be communication through a wide area communication network such as the Internet. Between the devices, instead of wireless communication, wired communication may be performed. Specifically, the wired communication is, for example, communication using power line communication (PLC) or a wired LAN.

For example, processing described in the above embodiments may be realized by centralized processing using a single device (system) or may be realized by distributed processing using a plurality of devices. Either a single processor or a plurality of processors may execute the programs described previously. In other words, centralized processing may be performed or distributed processing may be performed.

In the embodiments described above, all or part of the constituent elements of the device may be formed by dedicated hardware or may be realized by executing a software program suitable for each of the constituent elements. A program executor such as a central processing unit (CPU) or a processor may read and execute a software program recorded in a recording medium such as a hard disk drive (HDD) or a semiconductor memory so as to realize the constituent elements.

The constituent elements of the device may be formed with one or a plurality of electronic circuits. The one or a plurality of electronic circuits each may be a general-purpose circuit or a dedicated circuit.

In the one or a plurality of electronic circuits, for example, a semiconductor device, an integrated circuit (IC), a large scale integration (LSI) circuit, or the like may be included. The IC circuit or the LSI circuit may be integrated into one chip. Although the circuit is referred to as the IC circuit or the LSI circuit, how the circuit is referred to is changed depending on the degree of integration, and the circuit may be referred to as a system LSI circuit, a very large scale integration (VLSI) circuit, or an ultra large scale integration (ULSI) circuit. A field programmable gate array (FPGA), which is programmed after the manufacturing of its LSI circuit, can be used for the same purpose.

The general or specific aspects of the present disclosure may be realized by a system, a device, a method, an integrated circuit, or a computer program. The general or specific aspects may also be realized by a non-transitory computer-readable recording medium such as an optical disc, a HDD, or a semiconductor memory in which the computer program is stored. The general or specific aspects may also be realized by any combination of a system, a device, a method, an integrated circuit, a computer program, and a recording medium.

In the embodiments described above, various types of change, replacement, addition, omission, and the like can be performed in the scope of claims or a scope equivalent thereto.

FURTHER INFORMATION ABOUT TECHNICAL BACKGROUND TO THIS APPLICATION

The disclosures of the following patent applications including specification, drawings and claims are incorporated herein by reference in their entirety: Japanese Patent Application No. 2019-052549 filed on Mar. 20, 2019 and PCT International Application No. PCT/JP2020/011659 filed on Mar. 17, 2020.

INDUSTRIAL APPLICABILITY

The present disclosure can be utilized as a risk analyzer and the like which can support sufficient security measures, and, for example, the present disclosure can be utilized for the support, the risk analysis, and the like of security measures on a control system in a factory or the assets of the control system.

The invention claimed is:

1. A risk analyzer that analyzes a risk of a system, the system including N elements connected to each other, N being a natural number greater than or equal to 2, the risk analyzer comprising:
   a processor; and
   a memory including a program that, when executed by the processor, causes the processor to perform operations, the operations including:
   receiving, as inputs, a cost of each of the N elements necessary for increasing a degree of safety against a threat to security, a connection relationship of at least part of the N elements, an entry point which is an element serving as an entry to the system, and a defense target which is an element to be protected in the system;
   identifying, based on the cost of each of the N elements and the connection relationship, a target element requiring a minimum total cost necessary for cutting off a target path from the entry point to the defense target by increasing a degree of safety of one or more of the elements on the target path to a threshold value or more, the target element being the one or more of the elements; and
   outputting element information indicating the target element,
   wherein the processor further
   updates the degree of safety of one or more of the elements indicated by the element information to a degree of safety increased by spending the cost of a corresponding element,
   identifies, based on the degree of safety of each of the N elements after being updated and the connection relationship, the target path among the paths extending from the entry point to the defense target, and repeats the identification of the target element, the updating of the degree of safety and the identification of the target path until the target path is not identified.

2. The risk analyzer according to claim 1,
wherein the processor calculates a minimum cut to identify the target element.

3. The risk analyzer according to claim 1,
wherein the processor updates a cost of M elements included in the N elements to a predetermined value greater than any of costs of remaining N-M elements and identifies the target element by using the updated cost, the M elements being characterized by a degree of safety that is difficult to increase, M being a natural number of 1 or more.

4. The risk analyzer according to claim 1,
wherein the processor receives a plurality of entry points as an input, and
when the processor receives the plurality of entry points, the processor identifies, as the target element, one or more of the elements requiring a minimum total cost necessary for cutting off all paths including the target path and extending from a first additional element connected to only the plurality of entry points to the defense target.

5. The risk analyzer according to claim 1,
wherein the processor receives a plurality of defense targets as an input, and
when the processor receives the plurality of defense targets, the processor
sets a cost of a second additional element connected to only the plurality of defense targets to a value greater than or equal to the cost of each of the N elements, and
identifies, as the target element, one or more of the elements requiring a minimum total cost necessary for cutting off all paths including the target path and extending from the entry point to the second additional element.

6. The risk analyzer according to claim 1,
wherein the processor receives a connection relationship of all the N elements as an input, and
the processor further determines the target path based on the connection relationship of all the N elements.

7. The risk analyzer according to claim 1,
wherein the connection relationship of the at least part of the N elements is the target path.

8. The risk analyzer according to claim 1,
wherein the processor further receives, as an input, the degree of safety of each of the N elements against the threat to security, and
the processor further identifies, based on the degree of safety of each of the N elements and the connection relationship, as the target path, a path in which a total sum of the degrees of safety of elements passed while the path extends from the entry point to the defense target is lower than a threshold value among paths extending from the entry point to the defense target.

9. The risk analyzer according to claim 1,
wherein the system is a control system, and
the N elements are N assets of the control system.

10. The risk analyzer according to claim 1,
wherein the system is a control system, and
the N elements are a plurality of attack steps included in attack procedures for a plurality of assets of the control system.

11. The risk analyzer according to claim 1,
wherein the system is an attack procedure for an asset of a control system, and
the N elements are N attack steps included in the attack procedure.

12. A risk analysis method for analyzing a risk of a system, the system including N elements connected to each other, N being a natural number greater than or equal to 2, the risk analysis method comprising:
receiving, as inputs, a cost of each of the N elements necessary for increasing a degree of safety against a threat to security, a connection relationship of at least part of the N elements, an entry point which is an element serving as an entry to the system, and a defense target which is an element to be protected in the system;
identifying, based on the cost of each of the N elements and the connection relationship, a target element requiring a minimum total cost necessary for cutting off a target path from the entry point to the defense target by increasing a degree of safety of one or more of the elements on the target path to a threshold value or more, the target element being the one or more of the elements; and
outputting element information indicating the target element,
wherein the risk analysis method further
updates the degree of safety of one or more of the elements indicated by the element information to a degree of safety increased by spending the cost of a corresponding element,
identifies, based on the degree of safety of each of the N elements after being updated and the connection relationship, the target path among the paths extending from the entry point to the defense target, and
repeats the identification of the target element, the updating of the degree of safety and the identification of the target path until the target path is not identified.

* * * * *